(12) United States Patent
Livesay et al.

(10) Patent No.: US 9,606,529 B2
(45) Date of Patent: Mar. 28, 2017

(54) USER CUSTOMIZATION OF AUTO-DETECTED DATA FOR ANALYSIS

(71) Applicant: MIQ LLC, Bellevue, WA (US)

(72) Inventors: Adam Monroe Livesay, Seattle, WA (US); Michael Thomas Larson, Portland, OR (US)

(73) Assignee: MIQ LLC, Bellevue, WA (US)

( * ) Notice: Subject to any disclaimer, the term of this patent is extended or adjusted under 35 U.S.C. 154(b) by 0 days.

(21) Appl. No.: 14/448,960

(22) Filed: Jul. 31, 2014

(65) Prior Publication Data

US 2016/0034158 A1    Feb. 4, 2016

(51) Int. Cl.
*G06F 3/0484* (2013.01)
*G05B 19/418* (2006.01)
*G06F 9/44* (2006.01)

(52) U.S. Cl.
CPC ............ *G05B 19/41835* (2013.01); *G05B 2219/31467* (2013.01); *G05B 2219/31479* (2013.01); *G06F 9/4445* (2013.01)

(58) Field of Classification Search
CPC .. G06F 3/048; G06F 3/04847; G06F 3/04842; G06F 9/4445; G05B 19/41835; G05B 2219/31467; G05B 2219/31479
USPC ........................................................ 715/736
See application file for complete search history.

(56) References Cited

U.S. PATENT DOCUMENTS

| | | | |
|---|---|---|---|
| 6,272,873 B1 | 8/2001 | Bass | |
| 6,862,589 B2 | 3/2005 | Grant | |
| 8,004,663 B1 * | 8/2011 | Melvin | ......................... 356/121 |
| 2002/0077779 A1 * | 6/2002 | Liebl et al. | .................... 702/183 |
| 2002/0112042 A1 * | 8/2002 | Coburn, II | .............. H04L 29/06 709/223 |
| 2002/0133273 A1 * | 9/2002 | Lowrey et al. | ................. 701/29 |
| 2005/0183421 A1 | 8/2005 | Vaynberg et al. | |
| 2006/0182055 A1 * | 8/2006 | Coffee et al. | ................. 370/328 |
| 2007/0063029 A1 | 3/2007 | Brandt et al. | |
| 2007/0208436 A1 * | 9/2007 | Das et al. | ....................... 700/44 |

(Continued)

OTHER PUBLICATIONS

Office Communication for U.S. Appl. No. 14/449,936 mailed on Feb. 18, 2016 (5 pages).
Office Communication for U.S. Appl. No. 14/754,431 mailed on Feb. 23, 2016 (18 pages).
Office Communication for U.S. Appl. No. 14/449,936 mailed on Oct. 21, 2015 (14 pages).

(Continued)

*Primary Examiner* — Jennifer To
*Assistant Examiner* — John Repsher, III
(74) *Attorney, Agent, or Firm* — John W. Branch; Lowe Graham Jones PLLC

(57) ABSTRACT

Embodiments are directed towards enabling users to customize data collection and analysis. A collection computer may automatically detect and dynamically update each of a plurality of sensors that may be currently providing real-time data regarding at least one characteristic of a machine. At least one sensor may be selected for local storage of its corresponding real-time data at the collection computer. And at least one sensor may be selected for remote storage of its corresponding real-time data by a server computer. A template may be employed to remotely display at least one characteristic of the machine based on current real-time data provided by at least one of the sensors identified by the template. In response to the user selecting at least one sensor for remote display, the template may be modified to include the remote display of the at least one sensor's corresponding current real-time data.

30 Claims, 15 Drawing Sheets

(56) References Cited

U.S. PATENT DOCUMENTS

| | | | |
|---|---|---|---|
| 2007/0268128 A1* | 11/2007 | Swanson et al. | 340/539.22 |
| 2008/0033600 A1 | 2/2008 | Norbeck | |
| 2008/0147571 A1 | 6/2008 | Greiner et al. | |
| 2009/0170537 A1* | 7/2009 | Mauti, Jr. | 455/466 |
| 2010/0100279 A1* | 4/2010 | Silvester | 701/35 |
| 2010/0135187 A1* | 6/2010 | Kwark | 370/254 |
| 2010/0145629 A1* | 6/2010 | Botich et al. | 702/23 |
| 2011/0153052 A1 | 6/2011 | Pettibone et al. | |
| 2012/0299828 A1 | 11/2012 | Grokop et al. | |
| 2012/0303392 A1* | 11/2012 | Depura et al. | 705/4 |
| 2013/0185675 A1* | 7/2013 | Perry et al. | 715/832 |
| 2013/0207783 A1 | 8/2013 | Cruzado et al. | |
| 2013/0298652 A1 | 11/2013 | Gillette, II | |
| 2014/0070924 A1 | 3/2014 | Wenger et al. | |
| 2014/0075362 A1* | 3/2014 | Gray et al. | 715/772 |
| 2015/0026622 A1* | 1/2015 | Roaldson et al. | 715/771 |
| 2015/0169922 A1 | 6/2015 | Krepel et al. | |

OTHER PUBLICATIONS

Office Communication for U.S. Appl. No. 14/449,936 mailed on Apr. 27 2015 (9 pages).
Office Communication for U.S. Appl. No. 14/919,393 mailed on Apr. 5, 2016 (23 pages).
Office Communication for US. Appl. No. 14/449,936 mailed on Mar. 23, 2016 (17 pages).
Office Communication for U.S. Appl. No. 15/009,566 mailed on Jun. 16, 2016, (7 pages).
Office Communication for U.S. Appl. No. 14/754,431 mailed on Aug. 4, 2016, (24 pages).
Office Communication for U.S. Appl. No. 14/449,936 mailed on Sep. 27, 2016, (17 pages).
Office Communication for U.S. Appl. No. 15/009,566 mailed on Oct. 6, 2016, (6 pages).
Office Communication for U.S. Appl. No. 14/754,431 mailed on Oct. 20, 2016, (7 pages).
Office Communication for U.S. Appl. No. 14/919,393 mailed on Oct. 26, 2016, (7 pages).

* cited by examiner

```
client config
{
    enable_upload 1
    server 54.191.231.67
    mac_address_file_name /sys/class/net/eth0/address
    port 9090
    canbus_name can0
    update_rate_seconds 10
    socket_timeout_seconds 1
    31939
    {
        65350 255
        61444 255
        65276 255
        65400 255
    }
    network_connection_timeout_ms 5000
    network_receive_timeout_ms 5000
    network_send_timeout_ms 5000
    network_retries 5
    network_retrytimeoutafterfailure_seconds 15
    canbus_socket_timeout_seconds 1
}
```

CAN bus scanning tools scan for J1939 codes

PGN count (# seen in one second), Source Address, priority, data (in hex)

```
PGN 61444 count 20 SA 1 priority 152 - FF FF FF 2E FF FF FF FF
PGN 65198 count 20 SA 1 priority 152 - FF FF FF FF FF FF FF 04
PGN 65214 count 20 SA 1 priority 152 - FF FF FF 6D 60 FF FF FF
PGN 65253 count 20 SA 1 priority 152 - FF FF FF FF 00 00 06 18
PGN 65262 count 20 SA 1 priority 152 - FF FF FF 2C 0E 2C BE 69 7E
PGN 65263 count 20 SA 1 priority 152 - FF FF FF FF 3D FF FF FF
PGN 65266 count 20 SA 1 priority 152 - FF FF FF FF FF 00 54
PGN 65270 count 20 SA 1 priority 152 - FF FF 20 B5 FF FF FF FF
PGN 65276 count 20 SA 1 priority 152 - FF FF FF FF FF 00 FF FF
PGN 65281 count 20 SA 1 priority 152 - FF FF FF FF FF 00 00 00
PGN 65282 count 20 SA 1 priority 152 - FF FF FF FF FF 00 00 00
PGN 65283 count 20 SA 1 priority 152 - FF FF FF FF FF 00 00 00
PGN 65284 count 20 SA 1 priority 152 - FF FF FF FF FF 00 00 00
PGN 65285 count 20 SA 1 priority 152 - FF FF FF FF FF 00 00 00
PGN 65350 count 20 SA 1 priority 152 - FF FF FF FF FF 00 FF FF
```

*FIG. 14*

USER CUSTOMIZATION OF AUTO-DETECTED DATA FOR ANALYSIS

TECHNICAL FIELD

The present invention relates generally to data collection, and more particular, but not exclusive, to enabling user customizations of the collection, storage, transmission, and/or analysis of sensor data related to machines and/or equipment.

BACKGROUND

Typically, commercial and industrial machinery have many different components and subsystems. These machines can include various mechanical, fluid, and/or electrical systems. If one system, subsystem, or component fails, a machine may be idle for some time while the failure is diagnosed and replacement components are ordered. The longer a machine sits idle, the more money that is lost to the machine's owner and/or operator. So, monitoring various aspects and characteristics of the machinery in real-time could help in diagnosing problems before they occur and providing helpful solutions when they do happen. Due to the complexity of these machines, however, the amount data obtained by monitoring a single machine may be overwhelming and its lack of context may be uninformative.

Moreover, because of the complexity of these machines, many different skill sets may be required to diagnose a component failure, determine the necessary repairs and/or replacement components, and perform the repair and/or install the replacement components. Sometimes a component may fail due to a malfunction or failure of another component, which may be difficult to diagnose. Because of machine complexity and the difficulty in diagnosing component failures, these machines may sit idle while repairs are performed, resulting in lost income. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like components throughout the various figures unless otherwise specified.

For a better understanding of the present invention, reference will be made to the following Detailed Description, which is to be read in association with the accompanying drawings, wherein:

FIG. 13 shows a use-case example of an embodiment of code that may be employed to customize a collection computer;

FIG. 14 shows a use-case example of an embodiment of controller area network codes that may be scanned by a collection computer.

DETAILED DESCRIPTION

Figure 1:
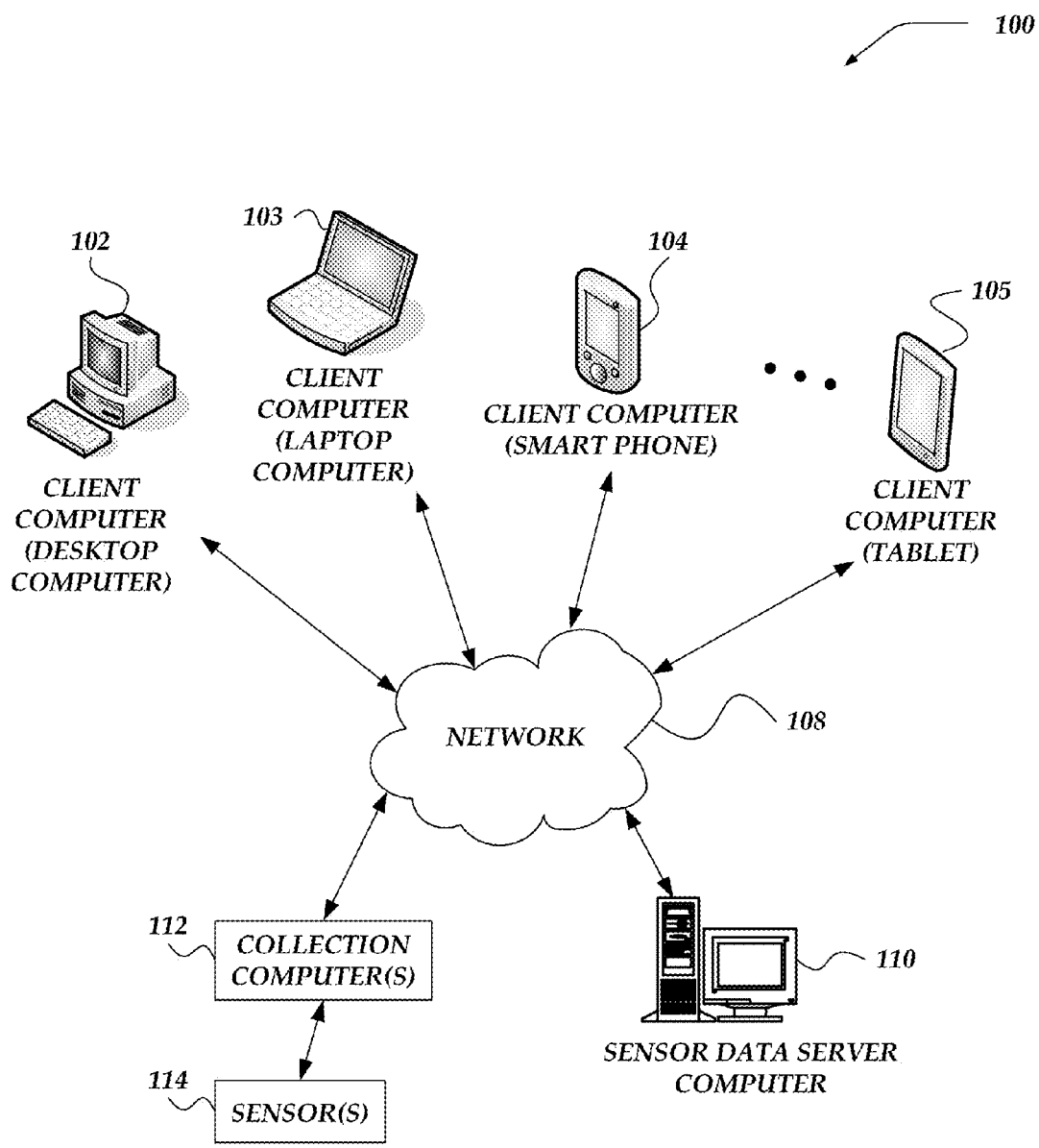
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "data collection computer" and "collection computer" may refer to a network computer device that can collect data from one or more sensors and provide the collected data to another network computer. In some embodiments, a collection computer may be referred to as a data collection node. In various embodiments, a collection computer may store at least some of the collected data. In other embodiments, the collection computer may transmit at least some of the collected data to a remote server computer. In various embodiments, a user may be enabled to customize the collection computer by selecting which sensors to collect, store, and/or transmit data.

As used herein, the term "sensor" may refer to a device that measures at least one characteristic of a machine and/or equipment. Examples of machine/equipment characteristics may include, but are not limited to, current load, current component movement/motion (e.g., a conveyer belt), hydraulic pressure, bearings, GPS location, gearbox temperature, hydraulic temperature, engine PRMs, vehicle speed, coolant temperature, engine coolant level, engine coolant pressure, engine oil temperature, engine oil level, engine oil pressure, engine fuel consumption rate, instantaneous fuel economy, average fuel economy, total average fuel economy, total fuel used, total engine idle hours, total engine idle fuel used, total engine hours of operation, fuel level, or the like. Examples of sensors may include, but are not limited to, pressure sensors, temperature sensors, load cells, revolutions per minute sensors, fluid level sensors, consumption or flow rate sensors, running time, idle time, location sensors (e.g., GPS), video cameras, still image cameras, motion sensors, humidity sensors, moisture sensors, vibration sensors, sound/acoustic sensors, or the like.

In some embodiments, the sensor may be mounted to, integrated with, or otherwise connected to the machine/equipment. In various embodiments, one or more sensors may be in communication with one or more collection computers. In some embodiments, each sensor may include or be connected to a controller that can convert signals received from the sensor into messages or other data formats that can be recognized and understood by the collection computer. In one non-limiting example, sensors may be in communication or connected to a collection computer by a controller area network (CAN), a National Marine Electronics Association (NMEA) 2000 network, an Aircraft Data Network (ADN), and the like. The network sensors may be identified by a corresponding CAN, NMEA 2000 or ADN identifier (e.g., a source address, unique sensor identifier, or the like).

As used herein, the term "machine," and "equipment" may refer to mechanical devices that can be used at a job site to perform actions. In at least one of various embodiments, the machine/equipment may be field-deployable or stationary. Examples machines/equipment may include, but are not limited to, industrial or construction equipment or vehicles or various components thereof. Machines/equipment may include virtually any system or subsystem that includes mechanical, electrical, fluid power systems, or the like. Examples, may include, but are not limited to, engines, motors, pumps, pistons, valves, winches, gearboxes, power units, manifolds, filters, cylinders, actuators, accumulators, lubrication systems/components, or other mechanical/hydraulic/pneumatic devices that have characteristics that can be monitored by one or more sensors.

As used herein, the term "template" may refer to a report or graphical representation of sensor data. Templates may be predetermined and/or generated, created by a user, modified by a user, or the like. Each template may include one or more gauges, charts, graphs, maps, or other visualizations to represent sensor data, which can be customized by a user. In various embodiments, a user may be enabled to select which sensors to view corresponding sensor data. In other embodiments, the sensors may be automatically selected for a template based on a machine being monitored, the sensors providing real-time data, historical data stored at the server, or the like.

Briefly stated, embodiments are directed towards enabling users to customize data collection and analysis. A collection computer may be coupled to a machine and in communication with a remotely located server computer. The collection computer may automatically detect each of a plurality of sensors that may be currently providing real-time data regarding at least one characteristic of the machine. In some embodiments, the collection computer may monitor a network such as a Controller Area Network (CAN), a National Marine Electronics Association (NMEA) 2000 network, an Aircraft Data Network (ADN), and the like. These networks may provide message identifiers that correspond to each sensor currently providing real-time data to the collection computer. In various embodiments, a user may be enabled to select a separate sampling rate of the current real-time data for at least a portion of the plurality of sensors.

In various embodiments, the plurality of sensors that are currently providing real-time data may be dynamically updated based on each new sensor currently providing real-time data and each existing sensor currently disabled from providing real-time data. So, if a sensor is disconnected, turned off, or otherwise disabled, a list of current sensors may be modified to remove the disabled sensor. Similarly, if a sensor is connected, turned on, or otherwise enabled such that it is a new sensor, then the list of current sensors may be modified to include the enabled sensor. In at some embodiments, the user may be notified of each new sensor currently providing real-time data and each currently disabled sensor. In various embodiments, the templates may be updated based on the new list of sensors currently providing real-time data.

In some embodiments, at least one of the plurality of sensors may be selected for local storage of its corresponding real-time data at the collection computer. In at least one embodiment, at least one of the plurality of sensors selected for local storage of its corresponding real-time data at the collection computer may be based on a network connection between the collection computer and the server computer. In various embodiments, in response to a user selecting at least one of the plurality of sensors for local display, at least one sensor's corresponding current real-time data at the machine may be locally displayed with the collection computer.

In other embodiments, at least one of the plurality of sensors may be selected for remote storage of its corresponding real-time data by the server computer. In various embodiments, a user may be enabled to select which sensor data is stored locally and which sensor data is stored remotely. In some embodiments, at least one of the plurality of sensors selected for remote storage of its corresponding real-time data by the server computer may be based on a sensor's data value being above a predetermined threshold. In at least one of various embodiments, a user may be enabled to select a separate period of time for communicating current real-time data for at least a portion of the plurality of sensors from the collection computer to the server computer. In various embodiments, the server computer may provide a separate database for each collection computer and a separate column in a table for current real-time data for each of the plurality of sensors detected by the collection computer.

In some embodiments, a template may be employed to automatically remotely display at least one characteristic of the operation of the machine based on current real-time data provided by at least one of the plurality of sensors identified by the template. In at least one of various embodiments, in response to the user selecting at least one of the plurality of sensors for remote display, the template may be modified to include the remote display of the at least one sensor's corresponding current real-time data. In various embodiments, the template may be selected or generated based on the sensors that are automatically detected, such that the user can select which sensors to view their corresponding data (both current real-time data and/or historic data). In some embodiments, the user may be enabled to drag and drop gauges, maps, graphs, or other visualizations into the template. Once a user drags and drops a visualization, the user can then select a sensor from a list of available sensors (i.e., those sensors that have data to be displayed, such as data that has been remotely stored at the server computer).

Illustrative Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include sensor data server computer (SDSC) 110, client computers 102-105, collection computer(s) 112, sensor(s) 114, and network 108.

At least one embodiment of client computers 102-105 is described in more detail below in conjunction with client computer 200 of FIG. 2. Briefly, in some embodiments, client computers 102-105 may be configured to communicate with collection computers 112, SDSC 110, and/or other network computers. In various embodiments, client computers 102-105 may be enabled to access and/or view reports for sensor data stored by SDSC 110, such as through a web browser. In at least one of various embodiments, a user of a client computer may be enabled to manipulate, configure, and customize report templates. Similarly, client computers 102-105 may be enabled to communicate (e.g., via a Bluetooth or other wireless technology, or via a USB cable or other wired technology) with collection computers 112, such as to configure a collection computer in which sensor data may be collected by the collection computer, stored at the collection computer, and/or transmitted to SDSC 110.

In some embodiments, at least some of client computers 102-105 may operate over a wired and/or wireless network to communicate with other computing devices, collection computers 112, or SDSC 110. Generally, client computers 102-105 may include computing devices capable of communicating over a network to send and/or receive information, perform various online and/or offline activities, or the like. It should be recognized that embodiments described herein are not constrained by the number or type of client computers employed, and more or fewer client computers— and/or types of client computers—than what is illustrated in FIG. 1 may be employed.

Devices that may operate as client computers 102-105 may include various computing devices that typically connect to a network or other computing device using a wired and/or wireless communications medium. Client computers 103-105 may be mobile devices and may include portable computers, and client computer 102 may include non-portable computers. Examples of client computer 102 may include, but is not limited to, desktop computers, personal computers, multiprocessor systems, microprocessor-based or programmable electronic devices, network PCs, or the like, or integrated devices combining functionality of one or more of the preceding devices. Examples of client computers 103-105 may include, but are not limited to, laptop computers (e.g., client computer 103), smart phones (e.g., client computer 104), tablet computers (e.g., client computer 105), cellular telephones, display pagers, Personal Digital Assistants (PDAs), handheld computers, wearable computing devices, or the like, or integrated devices combining functionality of one or more of the preceding devices. As such, client computers 102-105 may include computers with a wide range of capabilities and features.

Client computers 102-105 may access and/or employ various computing applications to enable users to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, client computers 102-105 may be enabled to connect to a network through a browser, or other web-based application.

Client computers 102-105 may further be configured to provide information that identifies the client computer. Such identifying information may include, but is not limited to, a type, capability, configuration, name, or the like, of the client computer. In at least one embodiment, a client computer may uniquely identify itself through any of a variety of mechanisms, such as an Internet Protocol (IP) address, phone number, Mobile Identification Number (MIN), media access control (MAC) address, electronic serial number (ESN), or other device identifier.

At least one embodiment of SDSC 110 is described in more detail below in conjunction with server computer 300 of FIG. 3. Briefly, in some embodiments, SDSC 110 may be operative to communicate with client computers 102-105 to enable users of client computers 102-105 to view and/or access sensor data stored/maintained by SDSC 110. In various embodiments, SDSC 110 may communicate with one or more collection computers 112 to configure the collection computer, receive sensor data from the collection computer, or the like. In some embodiments, SDSC 110 may maintain one or more report templates which can be generated, modified, and/or customized based on sensor data transmitted from a collection computer and/or based on input by a user (e.g., a user's selection of one or more sensors).

At least one embodiment of collection computer 112 is described in more detail below in conjunction with collection computer 400 of FIG. 4. Briefly, in some embodiments, collection computer 112 may monitor and/or collect sensor data from one or more sensors 114. In some embodiments, collection computer 112 may store at least some of the sensor data locally on collection computer 112. In other embodiments, collection computer 112 may transmit at least some of the sensor data to SDSC 110. In various embodiments, the data that is collected, stored, and/or transmitted may be configured by a user of client computers 102-105 and/or a user of SDSC 110.

In some embodiments, the sensor data collected by collection computer 112 may be based on a list of sensors in communication with the collection computer 112. In at least one of various embodiments, this list may be determined/ defined by a user. In another embodiment, the list of sensors may include a plurality of sensors that automatically detect as currently providing real-time data regarding at least one characteristic of a machine. The list of sensors that are currently providing real-time data may be dynamically updated based on each new sensor currently providing real-time data and each existing sensor currently disabled from providing real-time data. So the list of current sensors may dynamically change depending on sensors being disabled or enabled to communicate with the collection computer.

Sensors 114 may include one or more sensors in communication with one or more collection computers 112. In some embodiments, sensors 114 may communicate with a collection computer 112 through a CAN, ADN, NMEA 2000, or other type of network connection (e.g., USB, Bluetooth, or the like). Sensors 114 may monitor and/or measure any of a variety of different system aspects and/or characteristics (e.g., mechanical, hydraulic, or electrical) of a machine or other equipment. These sensors may be directly mounted and/or integrated into one or more components of the machine.

Network 108 may include virtually any wired and/or wireless technology for communicating with a remote device, such as, but not limited to, USB cable, Bluetooth, Wi-Fi, or the like. In some embodiments, network 108 may be a network configured to couple network computers with other computing devices, including client computers 102-105, collection computers 112, SDSC 110, or the like. In at least one of various embodiments, sensors 114 may be coupled to network computers via network 108, which is not illustrated in FIG. 1. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks, Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least client computers 102-105 (or other mobile devices). Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), orthogonal frequency-division multiplexing (OFDM), ultra wide band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-time Transport Protocol (SIP/RTP), Short Message Service (SMS), Multimedia Messaging Service (MMS), or any of a variety of other communication protocols and/or technologies. In essence, the network may include communication technologies by which information may travel between client computers 102-105, SDSC 110, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

Illustrative Client Computer

Figure 2:
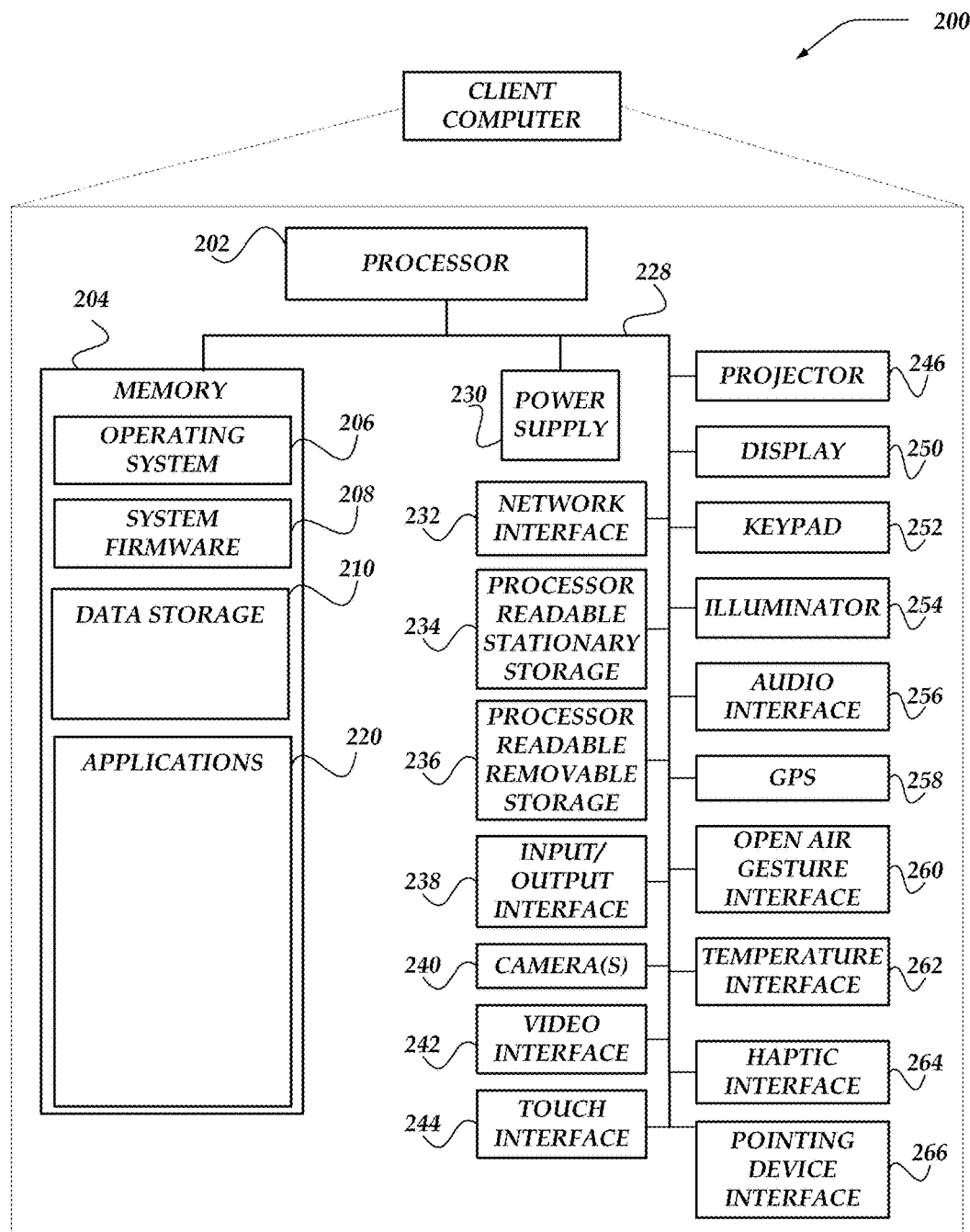
FIG. 2 shows an embodiment of a client computer that may be included in a system such as that shown in FIG. 1.

FIG. 2 shows one embodiment of client 200 that may include many more or less components than those shown. Client computer 200 may represent, for example, at least one embodiment of client computers 102-105 shown in FIG. 1. So, client computer 200 may be a mobile device (e.g., a smart phone or tablet), a stationary/desktop computer, or the like.

Client computer 200 may include processor 202 in communication with memory 204 via bus 228. Client computer 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266, or the like. Client computer 200 may optionally communicate with a base station (not shown), or directly with another computer. And in one embodiment, although not shown, an accelerometer or gyroscope may be employed within client computer 200 for measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model, GSM, CDMA, TDMA, UDP, TCP/IP, SMS, MMS, GPRS, WAP, UWB, WiMax, SIP/RTP, GPRS, EDGE, WCDMA, LTE, UMTS, OFDM, CDMA2000, Ev-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light-emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Client computer 200 may also comprise input/output interface 238 for communicating with external peripheral devices or other computers such as other mobile computers and network computers. Input/output interface 238 may enable client computer 200 to communicate with one or more servers, such as SDSC 110 of FIG. 1. In some embodiments, input/output interface 238 may enable client computer 200 to connect and communicate with one or more collection computers, such as collection computers 112 of FIG. 1. Other peripheral devices that client computer 200 may communicate with may include remote speakers and/or microphones, headphones, display screen glasses, or the like. Input/output interface 238 can utilize one or more technologies, such as Universal Serial Bus (USB), Infrared, Wi-Fi, WiMax, Bluetooth™, wired technologies, or the like.

Haptic interface 264 may be arranged to provide tactile feedback to a user of a client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 200 on the surface of the Earth. It is understood that under different conditions, GPS transceiver 258 can determine a physical location for mobile device 200. In at least one embodiment, however, client computer 200 may, through other components, provide other information that may be employed to determine a physical location of the mobile computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A client computer may include a browser application that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

In various embodiments, the browser application may be configured to enable a user to log into an account and/or user interface to access/view sensor data. In at least one of various embodiments, the browser may enable a user to view reports of sensor data that is stored by SDSC 110 of FIG. 1. In some embodiments, the browser/user interface may enable the user to customize a view of the report, such as which sensor data is displayed, what types of graphics or information may be displayed, or the like. As described herein, the extent to which a user can customize the reports may depend on permissions/restrictions for that particular user.

In various embodiments, the user interface may present the user with one or more initial templates for viewing the sensor data. In some embodiments, the templates may include gauges, graphs, maps, charts, or other visualizations that can be used to visually represent sensor data. In some embodiments, the template may include a list of sensors that are available for which the user can view corresponding data. This corresponding data may be current real-time sensor data (e.g., by employing a real-time gauge) and/or historic data (e.g., by using a line graph). In some embodiments, the user may be enabled to select from the sensor list which sensors to include in the template/report. In other embodiments, the sensors may be initially selected based on the machine that is being monitored, the type of sensors being used, or the like.

Memory 204 may include RAM, ROM, and/or other types of memory. Memory 204 illustrates an example of computer-readable storage media (devices) for storage of information such as computer-readable instructions, data structures, program modules or other data. Memory 204 may store system firmware 208 (e.g., BIOS) for controlling low-level operation of client computer 200. The memory may also store operating system 206 for controlling the operation of client computer 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the mobile device.

Applications 220 may include computer executable instructions which, when executed by client computer 200, transmit, receive, and/or otherwise process instructions and data. Examples of application programs include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

So, in some embodiments, client computer 200 may be enabled to employ various embodiments, combinations of embodiments, processes, or parts of processes, as described herein.

Illustrative Server Computer

Figure 3:
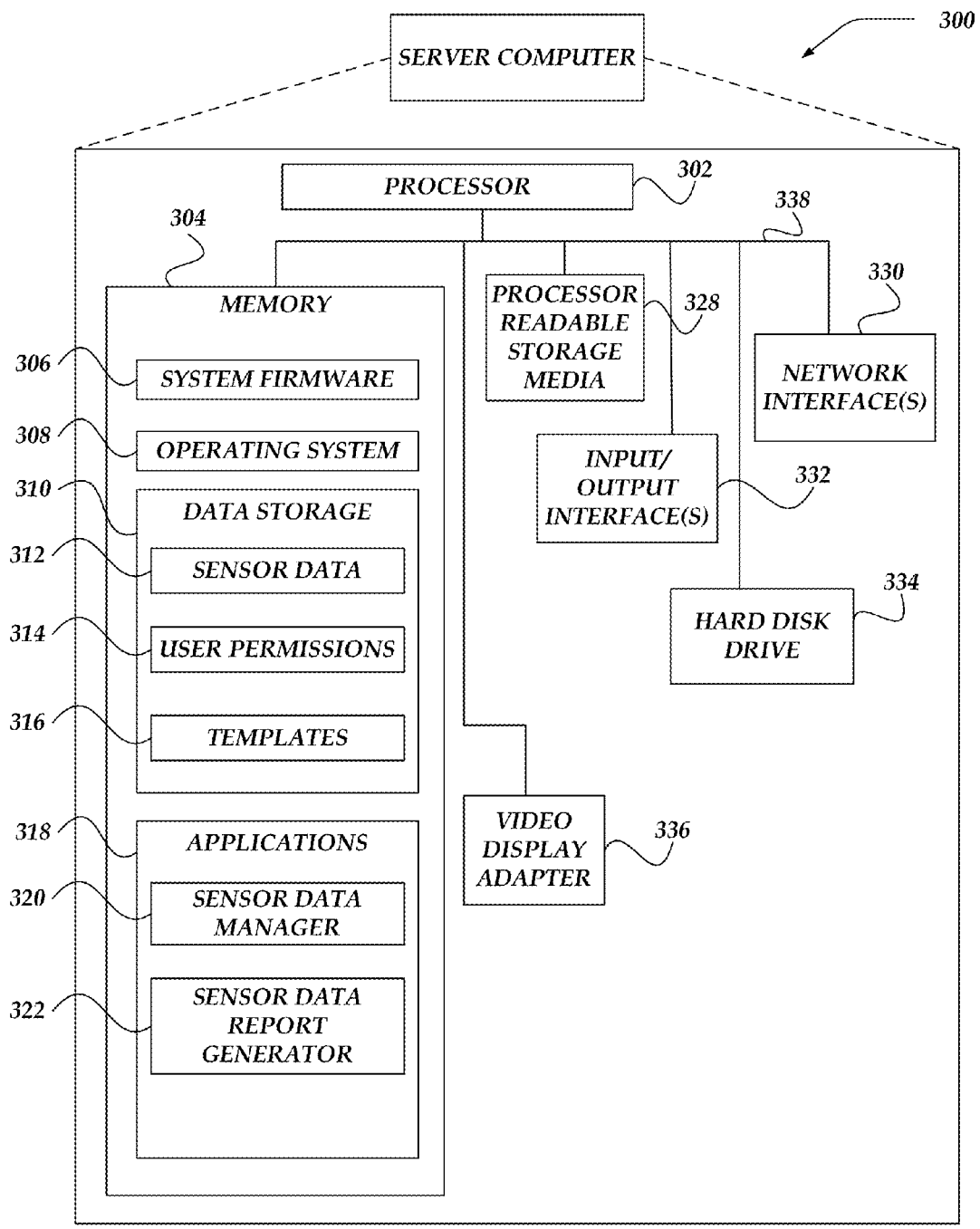
FIG. 3 illustrates an embodiment of a server computer that may be included in a system such as that shown in FIG. 1.

FIG. 3 shows one embodiment of a server computer 300, according to one embodiment of the invention. Server computer 300 may include many more or less components than those shown. The components shown, however, are sufficient to disclose an illustrative embodiment for practicing the invention. Server computer 300 may represent, for example SDSC 110 of FIG. 1.

Server computer 300 may include processor 302, processor readable storage media 328, network interface unit 330, an input/output interface 332, hard disk drive 334, video display adapter 336, and memory 304, all in communication with each other via bus 338. In some embodiments, processor 302 may include one or more central processing units.

As illustrated in FIG. 3, server computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Server computer 300 also comprises input/output interface 332 for communicating with external devices, such as a keyboard or other input or output devices not shown in FIG. 3. Input/output interface 332 can utilize one or more communication technologies, such as USB, infrared, Bluetooth™, or the like.

Memory 304 generally includes RAM, ROM and one or more permanent mass storage devices, such as hard disk drive 334, tape drive, optical drive, and/or floppy disk drive. Memory 304 stores operating system 308 for controlling the operation of server computer 300. Any general-purpose operating system may be employed. System firmware 306 is also provided for controlling the low-level operation of server computer 300 (e.g., BIOS).

Although illustrated separately, memory 304 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 304 further includes one or more data storage 310, which can be utilized by server computer 300 to store, among other things, applications 318 and/or other data. For example, data storage 310 may also be employed to store information that describes various capabilities of server computer 300. The information may then be provided to another device based on any of a variety of events, including being sent as part of a header during a communication, sent upon request, or the like.

Data storage 310 may also include a database, text, spreadsheet, folder, file, or the like, that may be configured to maintain and store user account identifiers, user profiles, email addresses, IM addresses, and/or other network addresses; or the like. Data storage 310 may further include program code, data, algorithms, and the like, for use by a processor, such as processor 302 to execute and perform actions. In one embodiment, at least some of data store 310 might also be stored on another component of server computer 300, including, but not limited to processor-readable storage media 328, hard disk drive 334, or the like.

Data storage 310 may include sensor data 312, user permissions 314, and/or templates 316. In some embodiments, this information (sensor data 312, user permissions 314, and templates 316) may be stored on a same server computer or on a plurality of separate server computers.

Sensor data 312 may include one or more databases for sensor data that has been collected from a collection computer (e.g., collection computers 112) to server computer 300. In various embodiments, a separate database may be maintained for each separate collection computer. In some embodiments, sensor data 312 may be transmitted from a collection computer to the server computer via a wired or wireless connection. In other embodiments, sensor data 312 may be provided to server computer 300 via a client computer, such as client computer 200. For example, a collection computer may not have a wireless connection (e.g., if it is out of range of a cellular network tower). A user may take a client computer to the site of the collection computer and upload the sensor data from the collection computer to the client computer (e.g., using a USB connection, accessing an SD card employed by the collection computer, or the like). The user can then upload the sensor data from the client computer to the server computer.

User permissions 314 may include one or more permissions for each of one or more users. Each permission may indicate how much customization a user is authorized to perform. For example, the permissions may indicate if and how a user can customize a collection computer, such as, for example, if a user can select which sensor data to collect, which sensor data to store locally to a collection computer, which sensor data to store remotely at a server computer. The permissions may also indicate if and how a user can customize sensor data reports and/or templates. In some embodiments, a user may be authorized to view data from only a subset of a plurality of sensors. In other embodiments, the user may be authorized to view the data, but may not modify the templates for displaying sensor data reports. In some other embodiments, the user permissions may indicate if a user can provide alert conditions and/or when a user can receive alerts based on alert conditions be satisfied.

Templates 316 may include one or more templates that can be employed for generating a report that displays sensor data to a user. In some embodiments, templates may be premade, such as by an administrator. In other embodiments, templates may be automatically generated based on a type of machine and/or component being monitored by the sensors. In yet other embodiments, the templates may be automatically generated based on the sensors that are currently providing real-time data. In various embodiments, at least some of the templates may be customizable by a user. The user may be enabled to manipulate which sensor data (e.g., by selected a sensor from a list of available sensors having previously provided data) is displayed in gauges, maps, charts, graphs or other visualization.

Applications 318 may include computer executable instructions, which may be loaded into mass memory and run on operating system 308. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth.

Applications 318 may include sensor data manager 320 and/or sensor data report generator. Sensor data manager 320 may be operative to manage one or more collection computers. In some embodiments, sensor data manager 320 may provision new databases if new collection computers log into server computer 300. Sensor data manager 320 may also be operative to manage the intake of sensor data, such as by adding received sensor data to a database that corresponds to the collection computer that collected the sensor data. In some embodiments, if a collection computer begins to collect sensor data from a previously unknown sensor, sensor data manager 320 may be enabled to assign a new column within a database table for the collection computer for sensor data obtained by the new sensor.

In some embodiments, sensor data manager 320 may be operative to provide instructions to a collection computer indicating which sensors the collection computer should collect data from, store data locally at the collection computer, and/or transmit data to the server computer or remote storage at the server computer. In some embodiments, these instructions may also indicate how often the collection computer is to collect, store, and/or transmit data. In various embodiments, sensor data manager 320 may include a user interface where a user may be enabled to provide this information.

Sensor data report generator 322 may be operative to enable a user to customize reports of sensor data 312 based on permissions 314 associated with the user. In various embodiments, sensor data report generator 322 may enable a user to log into an account and access a user interface where they can select sensors, gauges, graphs, or the like, which can be employed to generate a customized report that can be displayed to the user. In various embodiments, sensor data report generator 322 may determine, generate, and/or maintain templates 316.

So, in some embodiments, server computer 300 may be enabled to employ various embodiments, combinations of embodiments, processes, or parts of processes, as described herein.

Illustrative Collection Computer

Figure 4:
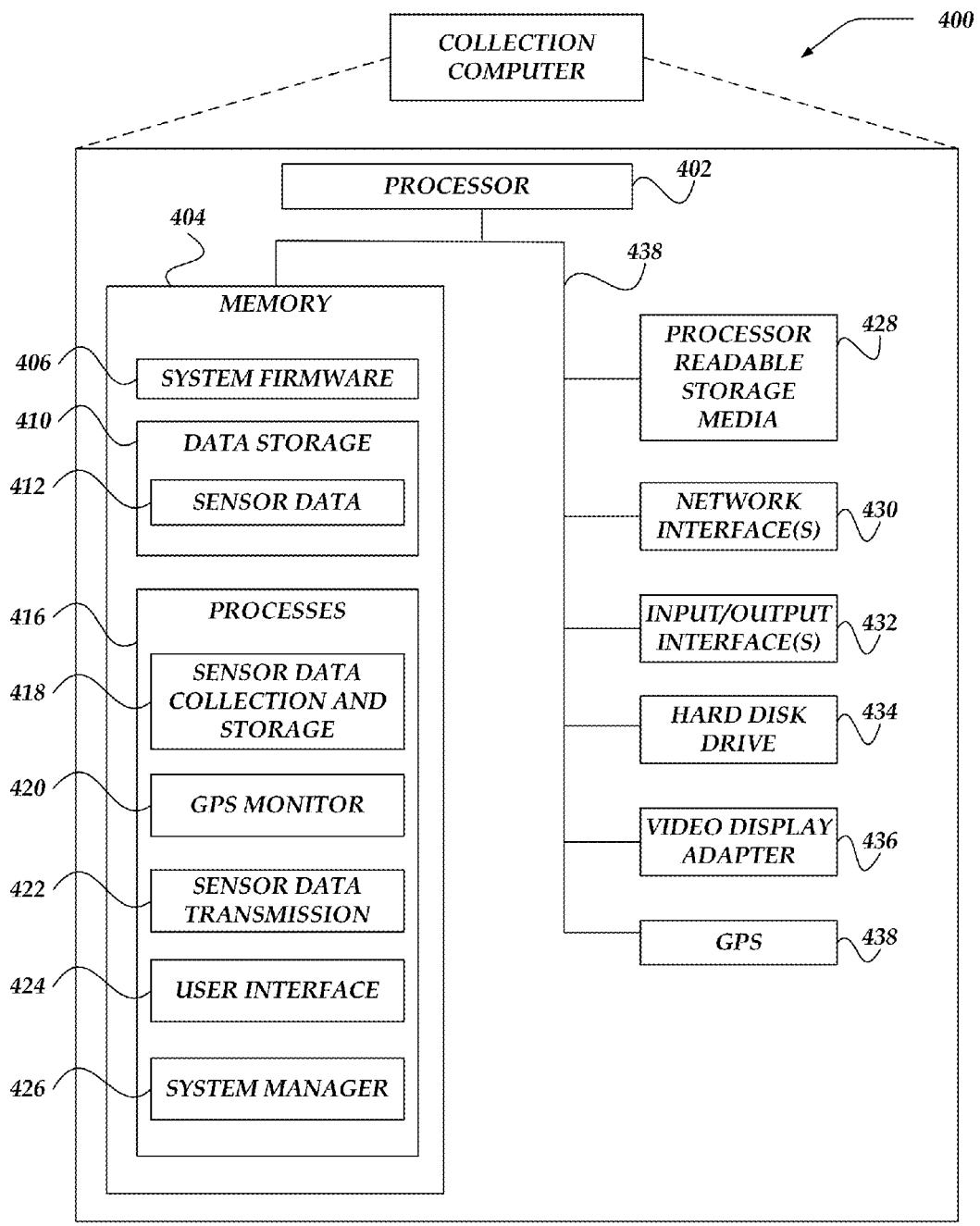
FIG. 4 illustrates an embodiment of a collection computer that may be included in a system such as that shown in FIG. 1.

FIG. 4 shows one embodiment of collection computer 400, according to one embodiment of the invention. Collection computer 400 may include many more or less components than those shown. The components shown, however, are sufficient to disclose an illustrative embodiment for practicing the invention. Collection computer 400 may represent, for example, one of collection computers 112 of FIG. 1.

Collection computer 400 may include processor 402, processor readable storage media 428, network interface unit 430, an input/output interface 432, hard disk drive 434, video display adapter 436, GPS 438, and memory 404, all in communication with each other via bus 438. In some embodiments, processor 402 may include one or more central processing units.

As illustrated in FIG. 4, collection computer 400 also can communicate with the Internet, cellular networks, or some other communications network (either wired or wireless), via network interface unit 430, which is constructed for use with various communication protocols. Network interface unit 430 is sometimes known as a transceiver, transceiving device, or network interface card (NIC). In some embodiments, collection computer 400 may communicate with a server computer, such as SDSC 110 of FIG. 1; sensors, such as sensors 114 of FIG. 1; and/or client computers, such as client computers 102-105 of FIG. 1, via the network interface unit 430.

Collection computer 400 also comprises input/output interface 432 for communicating with external devices, such as a various sensors or other input or output devices not shown in FIG. 4. Input/output interface 432 can utilize one or more communication technologies, such as USB, infrared, Bluetooth™, or the like.

Memory 404 generally includes RAM, ROM and one or more permanent mass storage devices, such as hard disk drive 434, tape drive, optical drive, and/or floppy disk drive. Memory 404 may store system firmware 406 for controlling the low-level operation of collection computer 400 (e.g., BIOS). In some embodiments, memory 404 may also store an operating system for controlling the operation of collection computer 400.

Although illustrated separately, memory 404 may include processor readable storage media 428. Processor readable storage media 428 may be referred to and/or include computer readable media, computer readable storage media, and/or processor readable storage device. Processor readable storage media 428 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 404 further includes one or more data storage 410, which can be utilized by collection computer 400 to store, among other things, sensor data 412, processes 416, and/or other data. For example, data storage 410 may further include program code, data, algorithms, and the like, for use by a processor, such as processor 402 to execute and perform actions. In one embodiment, at least some of data storage 410 might also be stored on another component of collection computer 400, including, but not limited to processor-readable storage media 428, hard disk drive 434, or the like.

Sensor data 412 may include data that is collected from one or more sensors. In various embodiments, sensor data 412 may store sensor data until it is successfully transmitted to a server, such as SDSC 110 of FIG. 1; until it is deleted by a user (e.g., if the user transfers all the sensor data from the collection computer to a client computer (e.g., client computers 102-105 of FIG. 1)); or the like.

Processes 416 may include computer executable instructions that can execute on processor 402 to perform actions. In some embodiments, one or more of processes 416 may be part of an application that may be loaded into mass memory and run on an operating system Processes 416 may include sensor data collection and storage 418, GPS monitor 420, sensor data transmission 422, user interface 424, and system manager 426.

Sensor data collection and storage 418 may manage the collection/intake of data from one or more sensors and may manage the local storage/logging of the collected sensor data at the collection computer. As described herein, a user may customize the collection computer such that it may or may not collect data from each sensor that it is in communication with. In some embodiments, sensor data collection and storage 418 may manage the sampling rate of one or more sensors, which may be selected by the user or automatically determined. Sensor data collection and storage 418 may manage the collection of sensor data based on the user customizations.

GPS monitor 420 may monitor GPS 438 for changes and may report changes to a user. In this way a user can track the movement of the equipment or machine that is being monitored by the sensors/collection computer. Changes in the GPS location can be employed to help determine if someone is attempting to steal the equipment, such as if the equipment is not to be removed from a jobsite.

Sensor data transmission 422 may manage the transmission of sensor data to a server, such as SDSC 110 of FIG. 1. As described herein, a user may customize a collection computer such that it may transmit some or all collected data to the server for remote storage by the server. The user may also be enabled to customize how often or when data may be transmitted to the server, which may be managed by sensor data transmission 422. If the collection computer is unable to transmit sensor data to the server (e.g., if the collection computer does not have a network connection), then sensor data transmission 422 may wait to begin transmission once the collection computer is again able to transmit data (e.g., if the network connection is restored). In some embodiments, sensor data transmission 422 manages the buffering of sensor data (e.g., in a queue) so that when a network connection is restored, the buffered data may be transmitted to the server.

User interface 424 may enable the user to provide the collection, storage, and transmission customizations described herein. In some embodiments, user interface 424 may enable a user to view to collected data in real-time or near-real time with the collection computer.

System manager 426 may provide other functionality to the collection computer 400. For example, system manager 426 may provide power management to the collection computer. In some embodiments, system manager 426 may be enabled to put the collection computer into a power saving mode when sensors are not being monitored, the equipment/machinery being monitored is shut off, or the like. System manager 426 may be enabled to "wake up" from this power saving mode based on a variety of watchdog conditions. For example, if the GPS or an accelerometer detects a change, then the system may wake up and transmit its location to the server.

So, in some embodiments, collection computer 400 may be enabled to employ various embodiments, combinations of embodiments, processes, or parts of processes, as described herein. Moreover, in various embodiments, collection computer 400 may be enabled to employ various embodiments described above in conjunction with server computer 300 of FIG. 3.

System Overview

Figure 5:
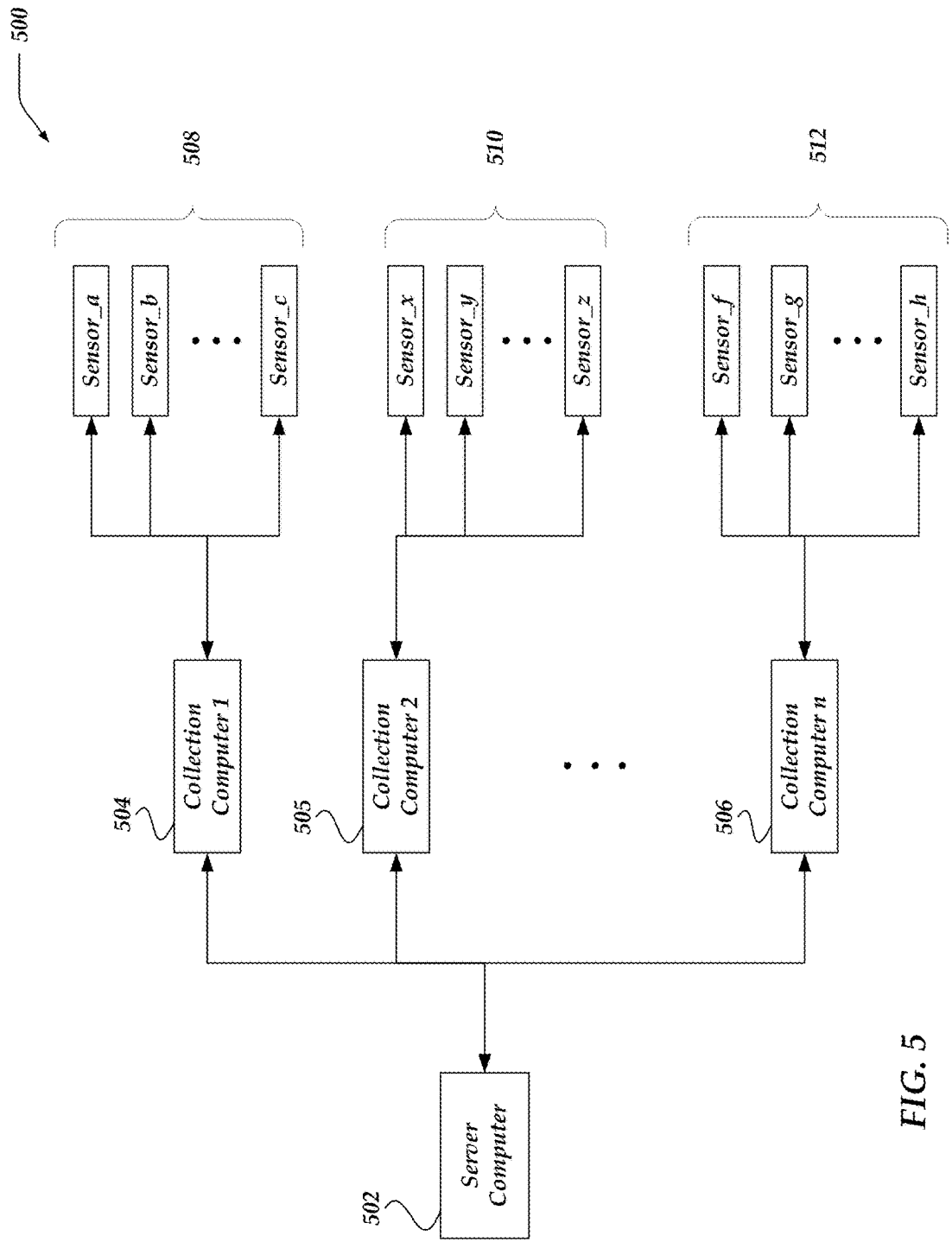
FIG. 5 illustrates an embodiment of a system diagram of collection computers in communication with a plurality of sensors and a server computer.

FIG. 5 illustrates an embodiment of a system diagram of collection computers in communication with a plurality of sensors and a server computer. System 500 may include server 502 and collection computers 504-506. Server 502 may be an embodiment of SDSC 110 of FIG. 1. And collection computers 504-506 may embodiments, of collection computers 112 of FIG. 1.

One or more collection computers 504-506 may be in communication with server 502. Collection computers 504-506 may provide sensor data to server 502 based on various user customizations. Each collection computer may be connected to or in communication with one or more sensors. For example, collection computer 504 may be in communication with sensors 508, collection computer 505 may be in communication with sensors 510, and collection computer 506 may be in communication with sensors 512. The collection computers may communicate with the sensors through a variety of different wired or wireless networks, such as, but not limited to, a CAN bus. Although system 500 illustrates a plurality of sensors communicating with each collection computer, embodiments are not so limited, but rather, in some embodiments, a collection computer may be in communication with a single sensor. Similarly, although not illustrated, some sensors may be connected to or communicate with a plurality of collection computers.

Figure 6:
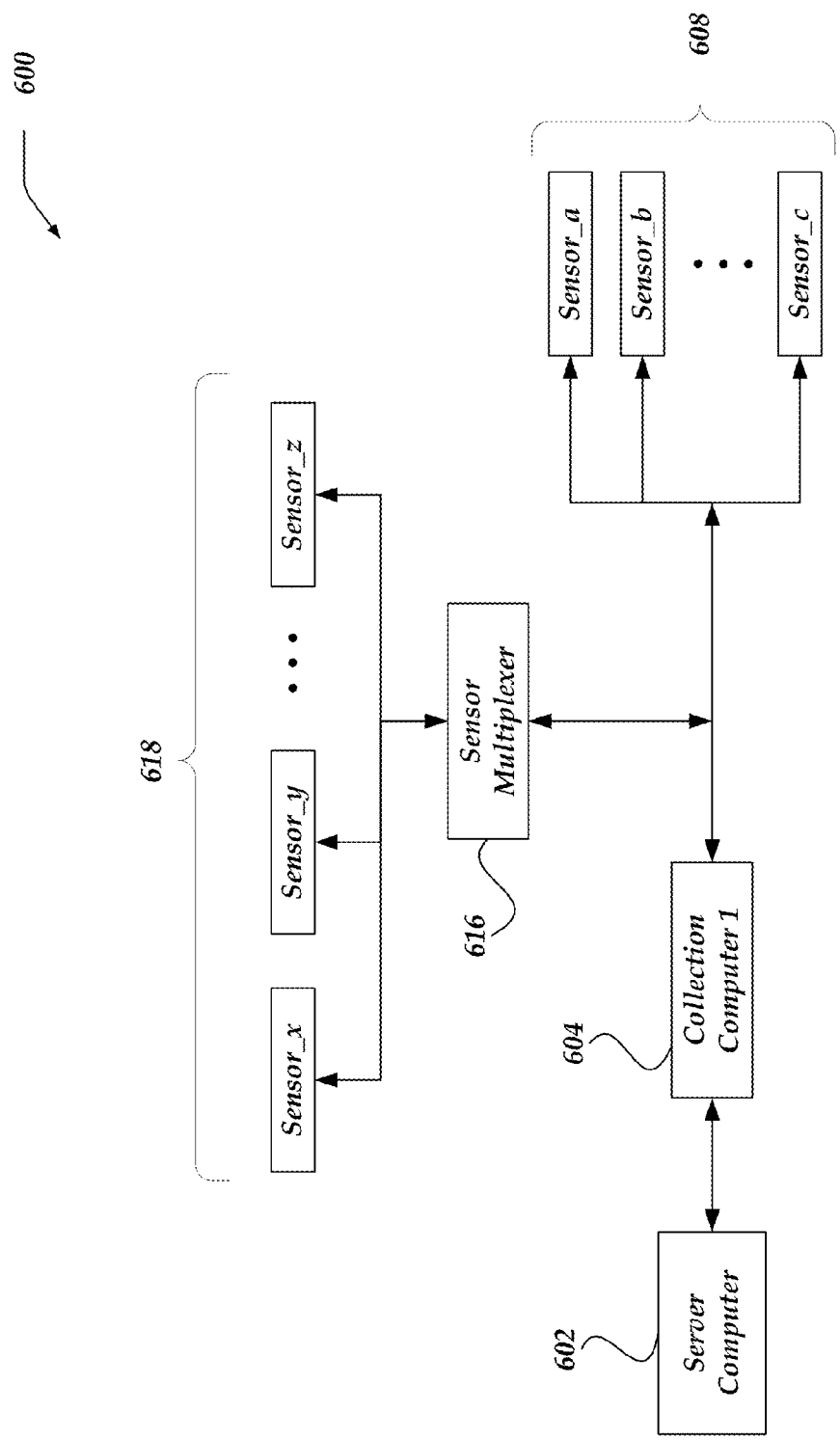
FIG. 6 illustrates an embodiment of a system diagram of a collection computer in communication with a plurality of sensors, a sensor multiplexer, and a server computer.

FIG. 6 illustrates an embodiment of a system diagram of a collection computer in communication with a plurality of sensors, a sensor multiplexer, and a server computer. System 600 may be an embodiment of system 500 of FIG. 5. System 600 may also include sensor multiplexer 616, which may be an intermediate device between sensors 618 and collection computer 604. In some embodiments, sensor multiplexor 616 may be a controller for managing signals provided by sensors 618 and converting/packaging the signals/data into messages that can be transmitted across a network, such as a CAN bus, ADN, or NMEA 2000 network, to collection computer 604.

Figure 7:
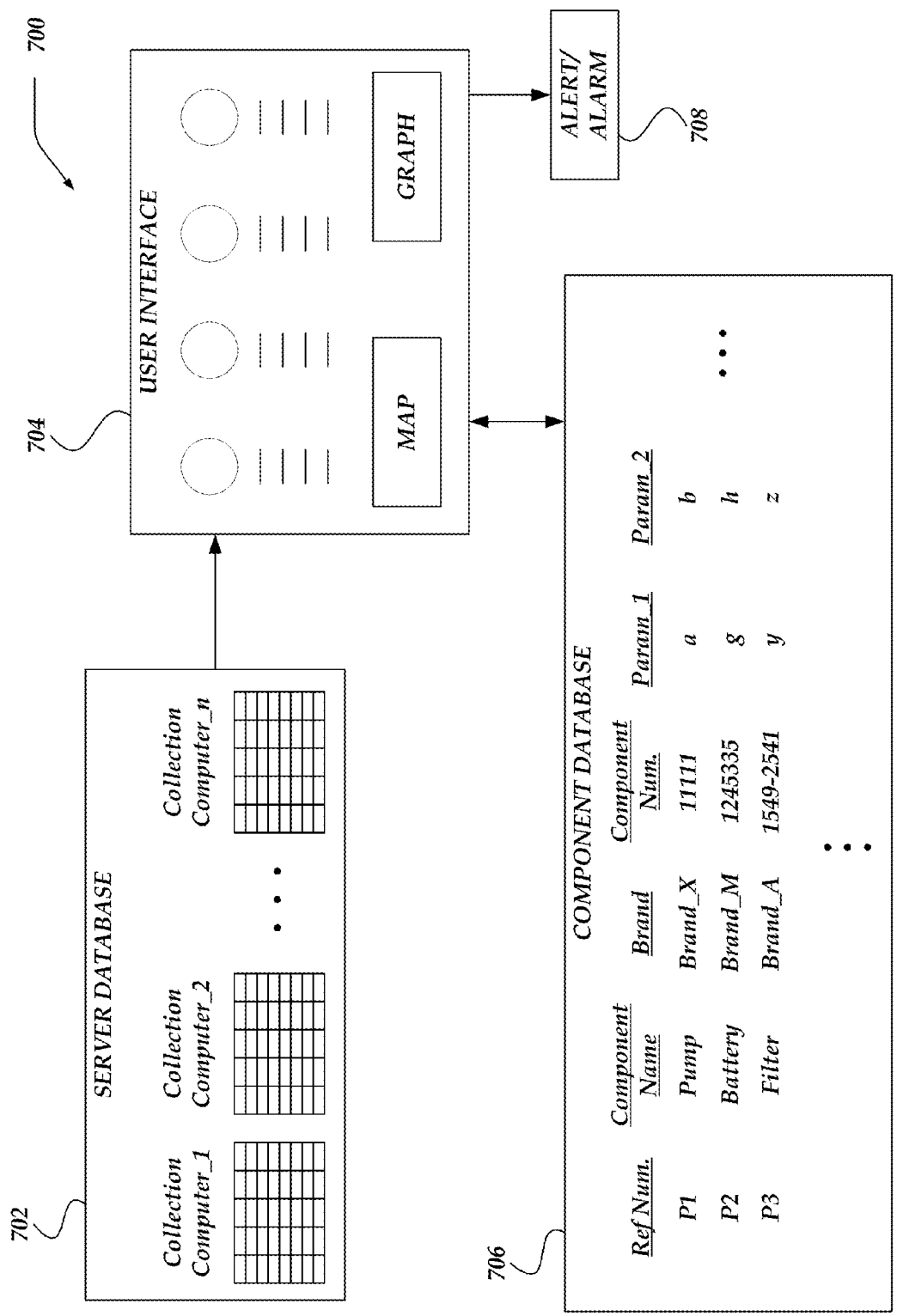
FIG. 7 illustrates an embodiment of a system diagram for providing customized reports and alert conditions to a user.

FIG. 7 illustrates an embodiment of a system diagram for providing customized reports and alert conditions to a user. System 700 may include server database 702, user interface 704, component database 706, and alert 708. Server database 702 may include a separate database for each separate collection computer. User interface 704 may be a report that include a plurality of gauges, a map, and/or one or more graphs of data from one or more sensors. In various embodiments, the user may be enabled to select which sensors to view data. In at least one of various embodiments, each gauge in the interface may represent real-time (or near real-time) data from the selected sensors. In some embodiments, the user may be enabled to drag and drop the gauges into the report for viewing, where each gauge corresponds to a separate sensor. User interface 704 may include a map of the current location of the collection computer (e.g., as provided by a GPS unit on the collection computer). User interface 704 may also include a graph to illustrate historical data for each sensor that is selected.

Component database 706 may include a plurality of components. In some embodiments, the user may be enabled to provide relationships between the components and data that is collected from the sensors. For example, the user can indicate that sensor_A is measuring some characteristic of component P1, sensor_B and sensor_C are measuring characteristics of component P2, and so on.

As described herein the user may be enabled to customize alert conditions, which if satisfied by the sensor data an alert or alarm 708 may be provided to one or more users. In some embodiments, the condition for triggering an alert may be provided by component database 706, such as a manufactures operating parameters. However, additional alert conditions may also be determined, provided, and/or otherwise defined by a user.

General Operation

The operation of certain aspects of the invention will now be described with respect to FIGS. 8-11. In at least one of various embodiments, processes 800, 900, 1000, or 1100 of FIGS. 8, 9, 10, and 11, respectively, may be implemented by and/or executed on a combination of computers, such as collection computer 400 of FIG. 4; client computer 200 of FIG. 2; and/or server computer 300 of FIG. 3. Additionally, various embodiments described herein can be implemented in a system such as system 100 of FIG. 1.

Figure 8:
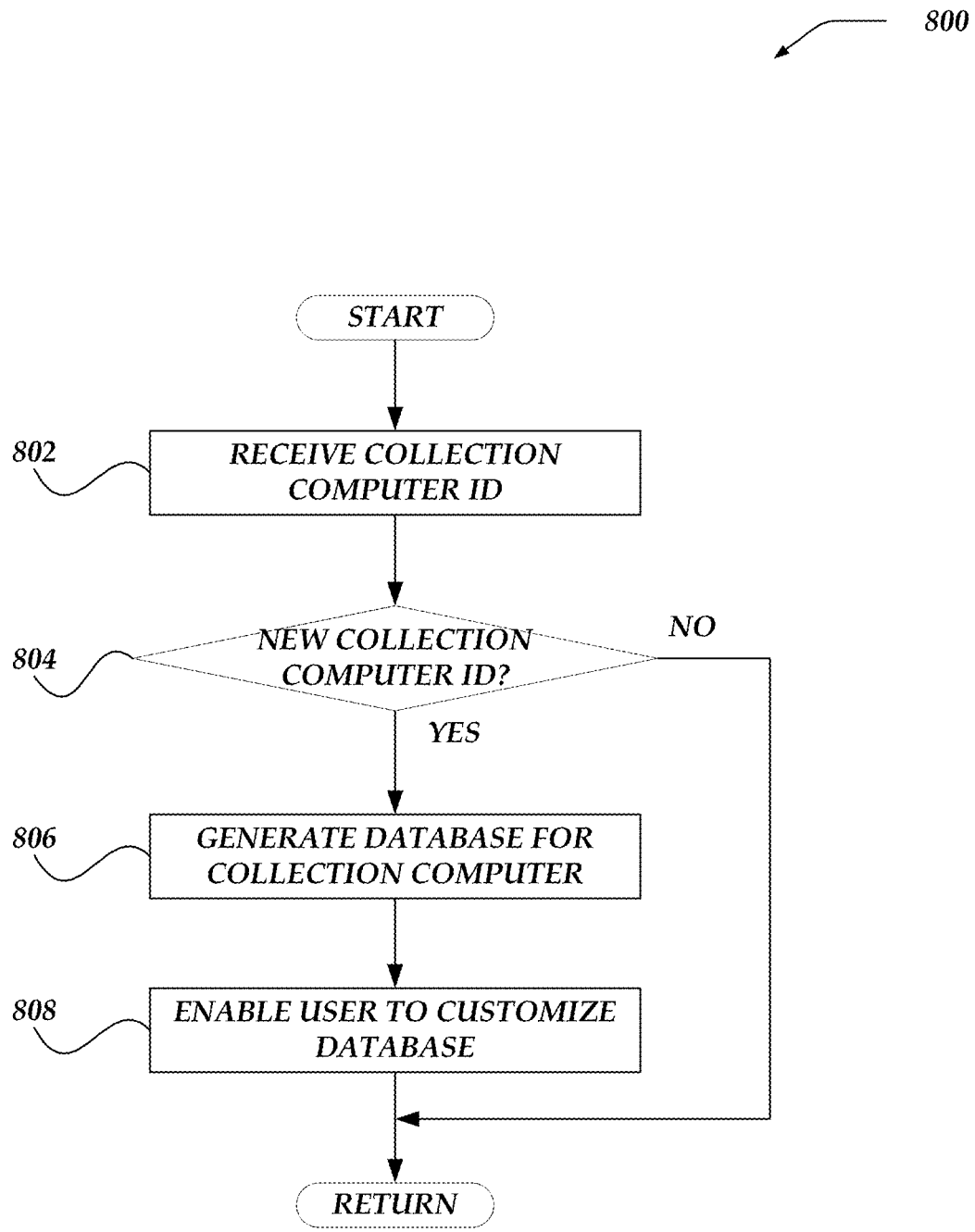
FIG. 8 illustrates a logical flow diagram generally showing one embodiment of a process for generating a database for a new collection computer that was previously unknown to a server computer.

FIG. 8 illustrates a logical flow diagram generally showing one embodiment of an overview process for generating a new collection computer database. Process 800 may begin, after a start block, at block 802, where a collection computer identifier (ID) may be received. In various embodiments, collection computers may be self-provisioning, such that each collection computer may include information identifying a server that the collection computer may communicate with. When a collection computer comes online or is installed, the collection computer may connect to the server to indicate that it is now part of the monitoring network.

Process 800 may proceed to decision block 804, where a determination may be made whether the received collection computer ID is a new collection computer ID or not. In various embodiments, collection computers may be powered down, turned off, lose communication with the server, or the like. If the collection computer comes back online, then the server may still recognize the collection computer ID as a previously known collection computer. However, if a new collection computer that the server has not seen before is powered up, then the received collection computer ID may be a new collection computer not previously known by the server. If the collection computer ID is a new collection computer ID, then process 804 may flow to block 806; otherwise, process 800 may terminate and/or return to a calling process to perform other actions.

At block 806, the server may generate a new database for the collection computer. In various embodiment, the server may maintain a separate database for each separate collection computer. A database for a collection computer may maintain recorded sensor data for one or more sensors connected to/monitored by that particular collection computer. As described herein, each separate column in a database table may be dedicated for separate sensors that are in communication with the collection computer. Each row may be a separately recorded data value provided by a sensor to the collection computer. In some embodiments, an identifier of the collection computer may be provided to the server computer along with the sensor data, which can be used to identify and/or generate a database for the collection computer.

Process 800 may continue next at block 808, where a user may be enabled to customize the database for the collection computer. User customizations may include, but are not limited to, naming the database for later generated reports, identifying sensors associated with the collection computer/database, customizing real-time monitoring of one or more sensors, customizing user permissions, or the like.

In at least one of various embodiments, the user may be enabled to provide a customized name and/or label for the database. This information may be used when generating reports and/or providing real-time updates of sensor data collected by the collection computer such that the user can quickly and easily identify which collection computer the data is associated with. For example, if the collection computer is collecting sensor data from a pump, then the user may provide a name and/or label that can be used easily identify the sensor data being associated with the pump.

In some embodiments, the user may be prompted, such as through a user interface, customize which sensors may be in communication with the collection computer. In some embodiments, the user may manually enter sensor identifying information. In other embodiments, the user may employ a camera, smartphone, barcode reader, or other scanning technology to obtain the sensor identifying information.

In various embodiments, sensor identifiers may be unique identifiers of a sensor, such as, but not limited to a serial number, network address/identifier, or the like. In other embodiments, these identifiers may be based on the collection computer input port that is associated with the sensor. For example, sensors may be connected to the collection computer via a controller area network (CAN) bus and the sensor identifier may be the CAN port and/or source address associated with the sensor. Although embodiments may be described as employing a CAN bus, other networks and/or communication technologies—e.g., Serial port, Bluetooth, or the like—may also be employed for communication between sensors and a collection computer.

In other embodiments, the user may be enabled to customize which sensor data may be displayable to a user in real-time reports. For example, a server may store sensor data for 10 separate sensors, but the user can indicate that sensor data from only three sensors may be displayed in the reports. However, embodiments are not so limited and the user may change which sensor data may be displayable in the report. In some embodiments, the user may change which sensor data may be displayed in real-time as the report is being generated and/or displayed to the user. As described herein, the user may employ templates for generating the real-time reports.

In some other embodiments, the user (or administrator) may be enabled to customize permissions for one or more users. In various embodiments, these permissions may indicate which sensor data, i.e., data from which sensors, can be viewed by each user. For example, user_A may have permission to view sensor data from sensors E, F, and G, but user_B may have permission to view sensor data from sensors G and M. Permissions may also define which users can specify which sensor data is collected and/or stored locally at a collection computer; whether the sensor data is transmitted and remotely stored at the server; how often sensor data is transmitted to the server; or the like. Moreover, user permissions may indicate various alerts that can be provided to users if alert conditions are satisfied by collected sensor data.

After block 808, process 800 may terminate and/or return to a calling process to perform other actions.

Figure 9:
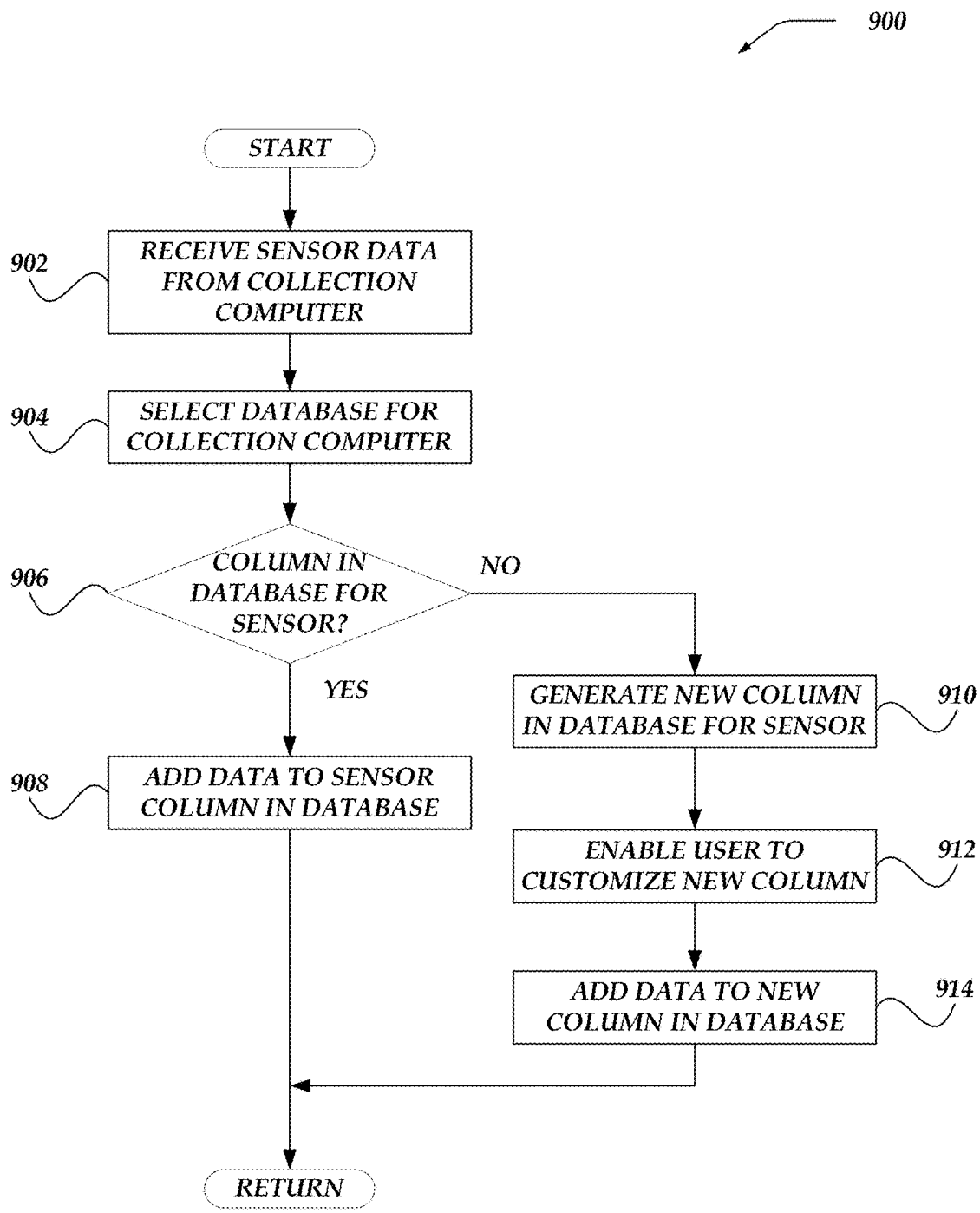
FIG. 9 illustrates a logical flow diagram generally showing one embodiment of a process for generating new columns of data for a new sensor that was previously unknown to a server computer.

FIG. 9 illustrates a logical flow diagram generally showing one embodiment of a process for generating new columns of data for a new sensor that was previously unknown to a server computer. Process 900 may begin, after a start block, at block 902, where a server may receive sensor data from a collection computer. As described herein, the sensor data may be obtained by a sensor that is in communication with a collection computer. The collection computer may collect the sensor data and may transmit it to the server. It should be understood that sensor data obtained by one or more different and/or separate sensors connected to the collection computer may be received. But for ease of illustration, process 900 is described with respect to a single sensor. So, a process 900 may be separately performed (e.g., concurrently) for sensor data obtained by each separate sensor.

In some embodiments, the received sensor data may include an identifier for the corresponding sensor. As described herein, this identifier may be a CAN, NMEA 2000, or ADN type of identifier, and the like. But other sensor identifiers may also be employed.

In some embodiments, the sensor data may be received from the collection computer at the server via a wired and/or wireless network. In other embodiments, the sensor data may be received through a storage device (e.g., an SD card, flash drive, or the like) that may have been removed from the collection computer and connected to the server.

Process 900 may proceed to block 904, where a database for the collection computer may be selected. As described herein, each collection computer may have a corresponding database maintained by the server. The proper database may be selected based on a collection computer ID associated with the received sensor data.

Process 900 may continue at decision block 906, where a determination may be made whether there is a column in the database table dedicated for sensor data obtained by the sensor. In various embodiments, each column in the database table may correspond to a separate sensor, and each row may include to separate sensor data obtained by a corresponding sensor. In some embodiments, each column may include metadata and/or a dedicated row that may include the sensor identifier for the sensor that corresponds to that column. These column sensor identifiers may be compared with the sensor identifier associated with the received sensor data to determine if there is a column in the database table for the sensor. If there is a column for the sensor data, then process 900 may flow to block 908; otherwise, process 900 may flow to block 910.

In various embodiments, if the sensor does not have a corresponding column in the database table, then the server may process the received sensor data as being for a new sensor or a previously unknown sensor—even though the collection computer may have been collecting and/or storing data from the sensor for some time but not transmitting it to the server.

At block 908, the received sensor data may be added to the column in the database table that corresponds to the sensor. In at least one of various embodiments, the received data may be appended to the column by adding another row and inserting the received data into the row. After block 908, process 900 may terminate and/or return to a calling process to perform other actions.

If, at decision block 906, there is no corresponding column in the database for the sensor, then process 900 may flow from decision block 906 to block 910. At block 910, a new column may be generated and/or allocated in the database for sensor data received from the sensor. In some embodiments, the sensor identifier (e.g., a corresponding CAN identifier) may be stored in a row or metadata of the new column.

Process 900 may proceed to block 912, where a user may be enabled to customize the new column. In at least one of various embodiments, the user may provide a name and/or label for the new column. This name may correspond to the sensor's identifier on the CAN. For example, in some embodiments, a generic type identifier may be assigned to a sensor when it is added to a CAN. For example, if a pump is added to the CAN, it may be provided a generic identifier, such as pmp00001. The user may be enabled to customize the database (e.g., the column in the table that corresponds to the sensor) for the collection computer so that sensor pmp00001 is displayed to a user as, e.g., "Seattle Pump 1".

In some embodiments, the user may be enabled to add permissions for the new column, such as which users may be enabled to view sensor data from the new column, whether or not data from the new column may be displayed in one or more reports (which may be tied into the user restrictions), setting alert conditions and/or thresholds for indicating when there may be a problem with a component of the machine, or the like. In some embodiments, block 912 may be optional and may not be performed.

Process 900 may continue at block 914, where the received sensor data may be added to the new column in the database. In various embodiments, block 914 may employ embodiments of block 908 for adding data to a column in the database.

After block 914, process 900 may terminate and/or return to a calling process to perform other actions.

Figure 10:
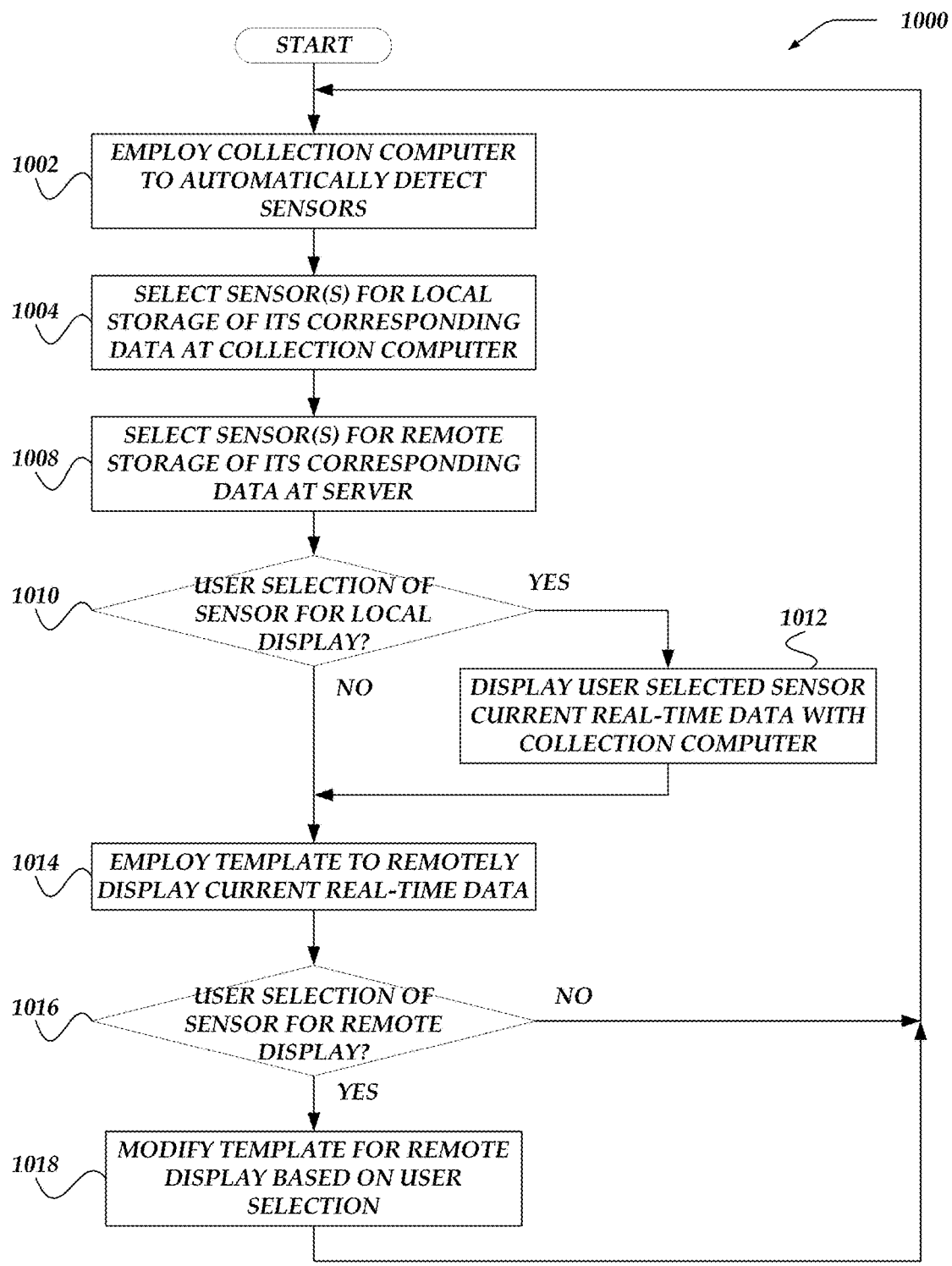
FIG. 10 illustrates a logical flow diagram generally showing one embodiment of a process for providing customized collection, storage, and transmission of sensor data.

FIG. 10 illustrates a logical flow diagram generally showing one embodiment of a process for providing customized collection, storage, and transmission of sensor data. Process 1000 may begin, after a start block, at block 1002, where a collection computer may be employed to automatically detect one or more sensors that may be currently providing real-time data regarding at least one aspect or characteristic of a machine/equipment. In various embodiments, the collection computer may identify these sensors based on an identifier, such as a CAN identifier. In some embodiments, the collection computer may include a list of the sensors that are providing current real-time data. These sensors may be referred to as available sensors.

In some embodiments, the list of available sensors may be dynamically updated based on changes in what sensors are providing current real-time data. If a sensor becomes disabled (e.g., because it is disconnected, loses communication with the collection computer, fails, or the like), then that sensor may be removed from the list of available sensors. If a sensor is enabled (e.g., becomes connected, provides sensor data to the collection computer (e.g., puts data on the CAN bus), or the like), then that sensor may be added to the list of available sensors. In various embodiments, the collection computer may continuously monitor which sensors are currently providing real-time data and may adjust the list of currently available sensors accordingly.

In some other embodiments, a user may be enabled to customize which sensor data may be collected at the collection computer. In at least one of various embodiments, collection of sensor data may include receiving data from a sensor, scanning a network for data provided by a sensor, or otherwise obtaining sensor data in real-time or near real-time. In some embodiments, the collection computer may be connected to a CAN bus and may obtain J1939 codes from one or more sensors (e.g., the collection computer may identify these sensors as providing current real-time data, such as described above). The user may be enabled to select which J1939 codes to monitor for collecting sensor data. So the user may customize which sensors may be monitored by the collection computer. It should be recognized that embodiments are not so limited and other networks, protocols, standards, or the like may be employed to obtain information from one or more sensors.

In some embodiments, the user may also customize how often data may be collected from a sensor, which may be referred to as a sample rate of a sensor. In various embodiments, data from separate sensors may be collected at separate rates, which may each be selected by the user. In this way, even if a sensor is providing data every one second, the collection computer may only collect the data every two minutes. This customization can enable the collection computer to not be overburdened with processing and/or storage resources for sensors that obtain data more frequently than what a user would like to collect.

Process 1000 may proceed to block 1004 where one or more sensors may be selected for local storage of its corresponding data at the collection computer. In various embodiments, a user may select which sensor data may be stored locally at the collection computer. So the collection computer may be customized by the user to store data from one or more sensors being monitored by the collection computer. For example, 50 sensors may be in communication with a collection computer. The user may select 14 of the 50 sensors for the collection computer to monitor/collect data (e.g., by using a user interface to select the sensors from a list of available sensors). The user may also select 10 of the 14 sensors for the collection computer to locally store corresponding sensor data.

In some other embodiments, the sensors for local storage of corresponding data at the collection computer may be automatically determined. In at least one of various embodiments, if an alert condition is satisfied by data from one sensor, then the collection computer may automatically store sensor data from a different sensor based on the alert condition. In another embodiment, if the collection computer loses communication with a server computer, then the collection computer may store sensor data until the communication is restored. Once the communication with the server is restored, the collection computer may halt local storage and may transmit the sensor data to the server for remote storage.

Process 1000 may continue at block 1008, where one or more sensors may be selected for remote storage of its corresponding data at a server computer. In various embodiments, a user may selected which sensor data may be stored remotely at the server. So the collection computer may be customized by the user to transmit sensor data from the collection computer to a server for storage. Continuing the example above, the user may select five of the 14 sensors for the collection computer to transmit corresponding sensor data to a server. In various embodiments, the user may be enabled to provide this customization through an interface built into the collection computer (e.g., a touch screen) or through a separate network computer (e.g., a laptop or the server) connected to the collection computer via USB, RS-232, other wired technologies, Bluetooth, Wi-Fi, or other wireless technologies.

Along with which sensor data may be transmitted to the server for remote storage by the server, the user may be enabled to customize or select how often the sensor data may be transmitted to the server. So the collection computer may be customized with separate transmission rates for each sensor. These rates may be a determined frequency, periodically, randomly, at given times, based on an event, or the like. For example, data from sensor_A may be transmitted to the server every three seconds, while data from sensor_B may be transmitted to the server every 10 minutes, and data from sensor_C may be transmitted upon a given event (e.g., if a GPS sensor indicates a change in coordinates). The collection computer may be customized such that each sensor may be assigned a different time or rate of transmission. In at least one of various embodiments, the collection computer may maintain a list of sensor identifiers from which data may be transmitted from the collection computer to the server, where each entry in the list includes metadata identifying when the data may be transmitted from the collection computer to the server for remote storage.

In any event, process 1000 may proceed to decision block 1010, where a determination may be made whether a user has selected one or more sensors for local display of current real-time data at the collection computer. In various embodiments, the collection computer may include a display and/or user interface that may enable a user to view current real-time data of one or more sensors. In some embodiments, a list of available sensors may be presented to the user, and the user may be enabled to select one or more sensors from the list. If the user selected at least one sensor for local display of real-time data, then process 1000 may flow to block 1012; otherwise, process 1000 may flow to block 1014.

At block 1012, the collection computer may display the user selected sensors' current real-time data. In some embodiments, the collection computer may include an LCD screen or other display for presenting the current real-time data of the selected sensors to the user. In some other embodiments, local display of current real-time sensor data may also be performed by a client computer that is connected to the collection computer. For example, a user may connect a laptop to a collection computer via USB. The client laptop may then be employed to enable the user to select one or more sensors and view the current real-time sensor data. In another example, collection computer may provide sensor data to a smart phone via W-Fi or Bluetooth for display of the current real-time sensor data. After block 1012, process 1000 may flow to block 1014.

If at decision block 1010, a user has not selected sensors for local display of sensor data, process 1000 may flow from decision block 1010 to block 1014. At block 1014, a template may be employed to remotely display current real-time sensor data and/or historic sensor data in a report format. As described herein, the collection computer may transmit sensor data to a server for remote storage. A user may be enabled to view and/access the sensor data via a user interface that may employ one or more templates.

A user may log into an account (e.g., through a web browser), where the user may be presented with one or more templates. Each template may include one or more preselected sensors and/or various predetermined visualizations (e.g., gauges, charts, graphs, maps, or the like). In some embodiments, a user may be enabled to customize a template by changing which sensors are selected for display of their corresponding data, changing a type of visualization for representing the sensor data, or the like.

In some embodiments, an initial template may be selected and/or generated based on user permissions. For example, if the user is only authorized to view specific sensor data, then the initial template provided to the user may be generated based on the sensor's that the user is authorized to view. In other embodiments, the initial template may be selected and/or generated based on a machine that is being monitored by a collection computer. For example, if the collection computer is collecting sensor data for sensors that are measuring characteristics of a dump trunk, then the sensors displayed in the template may be based on the sensors most often monitored on a dump truck. This determination may be based on a comparison of a plurality of users viewing sensor data for the machine. In yet other embodiments, the initial template may be selected and/or generated based on the sensor data that has been remotely stored at the server. In at least one embodiment, if current real-time data is being transmitted for a sensor to the server, then the template may include that sensor's data. In contrast, if there is no current or up-to-date data for a sensor, then the template may omit or otherwise remove that sensor's data from the template. In this way, the initial view to the user may be only those sensors that a currently providing real-time data that is being transmitted and stored at the server.

In various embodiments, the user may be enabled to customize a previously selected/generated template or to create their own customized template. In some embodiments, the user may be enabled to select one or more sensors for including their corresponding data in the template. A user interface may provide a list of sensors that the user can select from. This list may be based on sensor that previously and/or are currently providing data that is being remotely stored at the server. The user interface may also enable the user to select various visualizations for the selected sensors.

For example, an initial template may be provided to the user based on the machine being monitored, such that an initial set of sensors is selected. The user may then deselect some of the initial set of selected sensors or may select additional sensors. Similarly, the user may be enabled to change which visualizations are used to display the data. In some embodiments, the user may be enable to select a time window of historical sensor data to be viewed.

In any event, process 1000 may proceed to decision block 1016, where a determination may be made whether a user has selected a sensor for remotely displaying sensor data. As described above, the user interface may enable a user to select one or more sensors for viewing their corresponding sensor data. If user has selected a sensor for remote display, then process 1000 may flow to block 1018; otherwise, process 1000 may loop to block 1002 to continue to collect and/or monitor sensor data.

At block 1018, the template may be modified based on the user selected sensors, which may modify the report that is displayed to the user. In various embodiments, modifying the template may include changing which sensor data is being displayed and/or which visualizations are being used to represent the sensor data. It should be recognized that various templates and/or user modifications may be made based on user customizations, data being providing by sensors, the machine being monitored, or the like.

After block 1018, process 1000 may loop to block 1002 to continue to collect and/or monitor sensor data, which may include automatically, dynamically changing a list of available sensors, selecting which sensor data is stored locally at the collection computer, which sensor data is transmitted to a server for remote storage, and the like.

Figure 11:
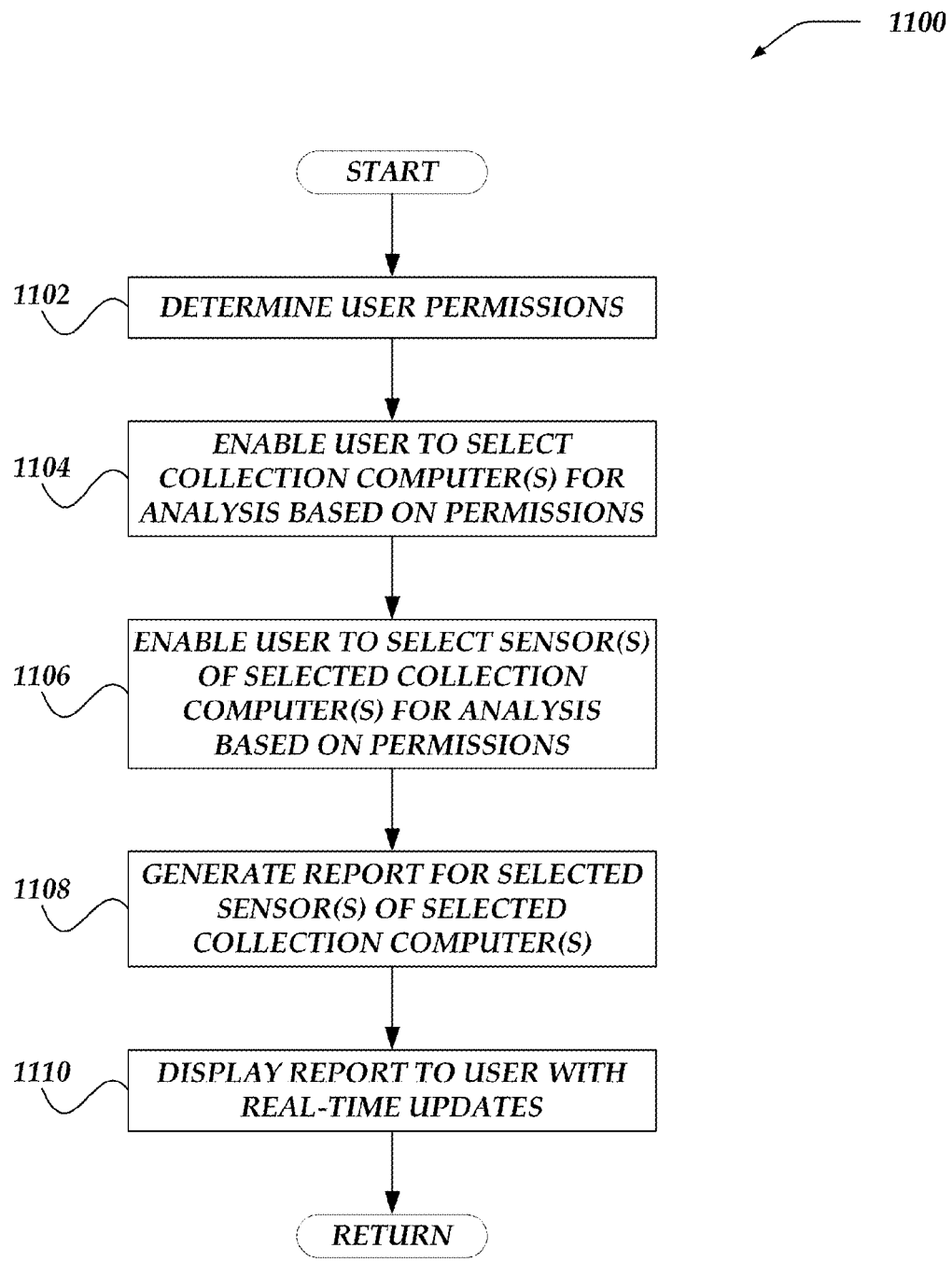
FIG. 11 illustrates a logical flow diagram generally showing one embodiment of a process for enabling a user to generate customized reports of sensor data.

FIG. 11 illustrates a logical flow diagram generally showing one embodiment of a process for enabling a user to generate customized reports of sensor data. Process 1100 may begin, after a start block, at block 1102, where user permissions may be determined. In various embodiments, an administrator or master user may be enabled to setup one or more user accounts with various roles and/or permissions. In some embodiments, these permissions may include, but is not limited to, modifying which sensor data may be collected (and/or how often it may be collected, e.g., a sample rate), which sensor data may be stored at the locally collection computer, which sensor data may be transmitted from the collection computer and remotely stored at the server (and/or how often it may be transmitted). In some embodiments, a user may have different permissions for separate collection computers and/or separate sensors.

In other embodiments, user permissions may indicate which sensors each user may view in a report. Some users may be enabled to view all sensor data that is transmitted from a collection computer to the server, while others may be enabled to view only a subset of all sensor data. And in some embodiments, some users may be enabled to view sensor data that is transmitted from the collection computer to the server, but not sensor data that is stored at the collection computer without transmitting to the server, while other users may be enabled to view all collected and/or stored data. In some embodiments, the user permissions may indicate if a user is authorized to view current real-time sensor data and/or historical sensor data.

In yet other embodiments, user permissions may indicate which users can add, modify, or delete alerts that may be triggered if sensor data values exceed a threshold—which may also be adjustable by some users based on their permissions. Embodiments, however, are not so limited and one or more permissions (or restrictions) may be defined for each of one or more users.

Moreover, the user permissions may indicate if a user is authorized to view various templates and/or modify templates. As described herein these templates may include gauges, graphs, charts and/or other visualization for displaying sensor data.

In any event, process 1100 may proceed to block 1104, where a user may be enabled to select one or more collection computers for analysis based on the permissions. In some embodiments, the user may log into an account associated with a user interface. The user interface may display the collection computer that the user has permission to view. The user may then select one or more of these collection computers for analysis, such as by engaging a check-box or other graphical user interface command.

Process 1100 may continue at block 1106, where the user may be enabled to select one or more sensors that are in communication with the selected collection computer based on the permissions. In various embodiments, the user interface that displayed the collection computer to the user may also display the sensors that the user has permission to view. In some embodiments, the sensors may be automatically selected for the user based on one or more templates. The template may be determined/selected based on the user permissions, based on the machine being monitored by the sensors, based on the sensors, or the like.

Process 1100 may proceed next to block 1108, where a report may be generated for the selected sensors of the selected collection computer. The report may provide current real-time sensor data that has been collected for the selected sensors and/or historical sensor data for a given period of time (which may be selected by the user). The report may include gauges, graphs, raw data, or other representations of the data, which can be displayed to and interpreted by the user. In various embodiments, the user interface may enable the user to drag and drop gauges, graphs, collection computers, sensors, or the like onto a screen to display data in a customized format. As described herein, one or more templates may be employed to generate the report. In some embodiments, each template may include different visualizations, different sensors, or the like. In various embodiments, the user may be enabled to customize and/or otherwise modify a template, which may be restricted based on the user permissions.

After block 1110, process 1100 may terminate and/or return to a calling process to perform other actions.

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), or a combination thereof. In some embodiments, software embodiments can include multiple processes or threads, launched statically or dynamically as needed, or the like.

The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

Use Case Illustrations

Figure 12:
FIG. 12 shows a use-case example of an embodiment of a user interface for enabling a user to customize the sensors measuring characteristics of a machine.

FIG. 12 shows a use-case example of an embodiment of a user interface for enabling a user to customize the sensors measuring characteristics of a machine. Interface 1200 may include a machine identifier, which may be a serial number of the machine. Interface 1200 may also include text boxes where the user can enter a name for the machine, a location of the machine, what customer is operating the machine, color for report gauges, GPS coordinates, or the like.

Interface 1200 may also enable the user to specify each sensor that is monitoring/measuring characteristics of the machine. For example, the user may specify the type of sensor, a name for the sensor (e.g., labeled "data point"), alert condition triggers (e.g., minimum and maximum), and other user customizable parameters.

FIG. 13 shows a use-case example of an embodiment of code that may be employed to customize a collection computer. Example 1300 may include a code sample for customizing a collection computer. In some embodiments, a server or other network computer may upload this code to the collection computer. Line 4 may identify the server that the collection computer may communicate with and transmit collected data to. Line 7 may identify a network for communicating with one or more sensors (e.g., a CAN, NMEA 2000, ADN, or the like). Line 8 may include a rate at which the collection computer may collect sensor data from the network. In some embodiments, a separate rate of collection may be customized for each separate sensor (not shown). Lines 10-16 may identify the sensors that the collection computer may be customized to collect data from. In some embodiments, the collection computer may monitor or scan a CAN bus for the four CAN source addresses identified, each of which may correspond to a different sensor. Lines 17-21 may include information for when, how often, and how many times to try sending data from the collection computer to the server.

FIG. 14 shows a use-case example of an embodiment of controller area network codes that may be scanned by a collection computer. Example 1400 may show results of a collection computer scanning a CAN bus for sensor data.

Figure 15:
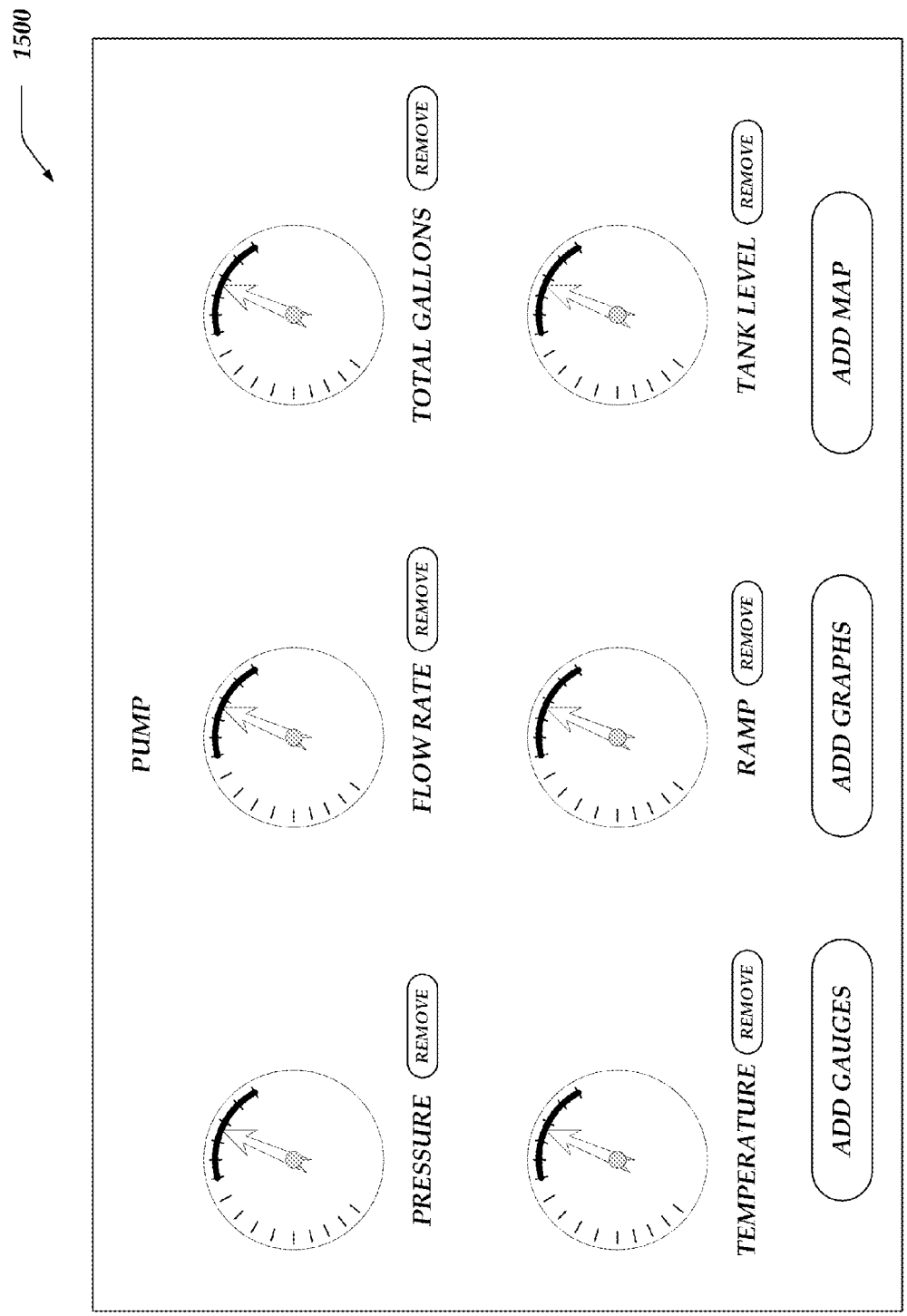
FIG. 15 shows a use-case example of an embodiment of a template that may be employed for displaying sensor data to a user.

FIG. 15 shows a use-case example of an embodiment of a template that may be employed for displaying sensor data to a user. Example 1500 may be an example template that may be displayed to a user for visualization of real-time sensor data. As described herein, the template may be automatically generated based on the machine being monitored. In the illustration a pump may be monitored. In various embodiments, the template may include gauges or other visualizations for common sensors that may be employed for a pump. In some other embodiments, the template may be based on the sensors that are automatically detected by the collection computer. For example, the collection computer may detect a pressure sensor, temperature sensor, and a flow rate sensor. Based on this combination of sensors, the template for a pump may be selected/generated, which may include the detected sensors and other sensors that are typically employed to monitor a pump.

In various embodiments, are user may be enabled to modify and/or customize a template. As illustrated, the user may be enabled to remove any of the gauges, add additional gauges, add graphs, add a map, or the like. In some embodiments, the user may be enabled to save a customized template as a new template. In this way, the user's saved template may be automatically utilized a next time a pump is monitored. In various embodiments, each of a plurality of users may be enabled to customize and/or save separate templates based on their user permissions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for managing sensor data for a machine, comprising:
    employing a collection computer to automatically detect each of a plurality of sensors that is currently providing real-time data regarding at least one characteristic of the machine, wherein the collection computer is coupled to the machine and in communication with a remotely located server computer, and wherein each sensor has one or more type;
    selecting at least one of the plurality of sensors for local storage of its corresponding real-time data at the collection computer;
    selecting at least one of the plurality of sensors for remote storage of its corresponding real-time data by the server computer;
    in response to a user selecting at least one of the plurality of sensors for local display, locally displaying its corresponding current real-time data at the machine with the collection computer;
    determining a type of the machine based on the one or more types of the plurality of sensors;
    automatically generating a template for the type of the machine based on a comparison of the plurality of sensors detected by the collection computer to other sensors that were most often previously monitored by a plurality of users viewing sensor data for this type of machine, wherein the template includes a plurality of predetermined visualizations for one or more of the detected sensors based on a result of the comparison and the machine's type;
    employing the template to automatically remotely display at least one characteristic of the machine based on current real-time data provided by at least one of the plurality of sensors identified by the template; and
    in response to the user selecting at least one of the plurality of sensors for remote display, modifying the template to include the remote display of its corresponding current real-time data.

2. The method of claim 1, further comprising dynamically updating the plurality of sensors that are currently providing real-time data based on each new sensor currently providing real-time data and each existing sensor currently disabled from providing real-time data, wherein the user is notified of each new sensor currently providing real-time data and each currently disabled sensor.

3. The method of claim 1, wherein selecting the at least one of the plurality of sensors for remote storage of its corresponding real-time data by the server computer is based on a sensor's data value being above a predetermined threshold.

4. The method of claim 1, wherein communicating current real-time data from the collection computer to the server computer further comprises:
    enabling the user to select a separate sampling rate of the current real-time data for at least a portion of the plurality of sensors; and
    enabling the user to select a separate period of time for communicating current real-time data for at least a portion of the plurality of sensors to the server computer.

5. The method of claim 1, further comprising monitoring at least one of a Controller Area Network, Aircraft Data Network, or a National Marine Equipment 2000 network for message identifiers that correspond to each sensor currently providing real-time data to the collection computer.

6. The method of claim 1, further comprising:
    providing a separate database for each collection computer; and
    providing a separate column in a table for current real-time data for each of the plurality of sensors detected by the collection computer.

7. The method of claim 1, wherein selecting the at least one of the plurality of sensors for local storage of its corresponding real-time data at the collection computer is based on a network connection between the collection computer and the server computer.

8. The method of claim 1, wherein employing the template to automatically remotely display at least one characteristic of the machine includes at least one user modifiable visualization that represents at least one sensor's current real-time data.

9. A processor readable non-transitory storage media that includes instructions for managing sensor data for a machine over a network, wherein the execution of the instructions by a processor enables actions, comprising:
employing a collection computer to automatically detect each of a plurality of sensors that is currently providing real-time data regarding at least one characteristic of the machine, wherein the collection computer is coupled to the machine and in communication with a remotely located server computer, and wherein each sensor has one or more type;
selecting at least one of the plurality of sensors for local storage of its corresponding real-time data at the collection computer;
selecting at least one of the plurality of sensors for remote storage of its corresponding real-time data by the server computer;
in response to a user selecting at least one of the plurality of sensors for local display, locally displaying its corresponding current real-time data at the machine with the collection computer;
determining a type of the machine based on the one or more types of the plurality of sensors;
automatically generating a template for the type of the machine based on a comparison of the plurality of sensors detected by the collection computer to other sensors that were most often previously monitored by a plurality of users viewing sensor data for this type of machine, wherein the template includes a plurality of predetermined visualizations for one or more of the detected sensors based on a result of the comparison and the machine's type;
employing the template to automatically remotely display at least one characteristic of the machine based on current real-time data provided by at least one of the plurality of sensors identified by the template; and
in response to the user selecting at least one of the plurality of sensors for remote display, modifying the template to include the remote display of its corresponding current real-time data.

10. The processor readable non-transitory storage media of claim 9, further comprising dynamically updating the plurality of sensors that are currently providing real-time data based on each new sensor currently providing real-time data and each existing sensor currently disabled from providing real-time data, wherein the user is notified of each new sensor currently providing real-time data and each currently disabled sensor.

11. The processor readable non-transitory storage media of claim 9, wherein selecting the at least one of the plurality of sensors for remote storage of its corresponding real-time data by the server computer is based on a sensor's data value being above a predetermined threshold.

12. The processor readable non-transitory storage media of claim 9, wherein communicating current real-time data from the collection computer to the server computer further comprises:
enabling the user to select a separate sampling rate of the current real-time data for at least a portion of the plurality of sensors; and
enabling the user to select a separate period of time for communicating current real-time data for at least a portion of the plurality of sensors to the server computer.

13. The processor readable non-transitory storage media of claim 9, further comprising monitoring at least one of a Controller Area Network, Aircraft Data Network, or a National Marine Equipment 2000 network for message identifiers that correspond to each sensor currently providing real-time data to the collection computer.

14. The processor readable non-transitory storage media of claim 9, further comprising:
providing a separate database for each collection computer; and
providing a separate column in a table for current real-time data for each of the plurality of sensors detected by the collection computer.

15. The processor readable non-transitory storage media of claim 9, wherein selecting the at least one of the plurality of sensors for local storage of its corresponding real-time data at the collection computer is based on a network connection between the collection computer and the server computer.

16. The processor readable non-transitory storage media of claim 9, wherein employing the template to automatically remotely display at least one characteristic of the machine includes at least one user modifiable visualization that represents at least one sensor's current real-time data.

17. A system for managing sensor data for a machine, comprising:
a collection computer that performs actions, including:
automatically detecting each of a plurality of sensors that is currently providing real-time data regarding at least one characteristic of the machine, wherein the collection computer is coupled to the machine and in communication with a remotely located server computer, and wherein each sensor has one or more type;
enabling selection of at least one of the plurality of sensors for local storage of its corresponding real-time data at the collection computer;
enabling selection of at least one of the plurality of sensors for remote storage of its corresponding real-time data by the server computer; and
in response to a user selecting at least one of the plurality of sensors for local display, locally displaying its corresponding current real-time data at the machine with the collection computer; and
the server computer performs actions, including:
determining a type of the machine based on the one or more types of the plurality of sensors;
automatically generating a template for the type of the machine based on a comparison of the plurality of sensors detected by the collection computer to other sensors that were most often previously monitored by a plurality of users viewing sensor data for this type of machine, wherein the template includes a plurality of predetermined visualizations for one or more of the detected sensors based on a result of the comparison and the machine's type;
employing the template to automatically remotely display at least one characteristic of the machine based on current real-time data provided by at least one of the plurality of sensors identified by the template; and
in response to the user selecting at least one of the plurality of sensors for remote display, modifying the template to include the remote display of its corresponding current real-time data.

18. The system of claim 17, wherein the collection computer performs further actions, comprising dynamically updating the plurality of sensors that are currently providing real-time data based on each new sensor currently providing real-time data and each existing sensor currently disabled from providing real-time data, wherein the user is notified of each new sensor currently providing real-time data and each currently disabled sensor.

19. The system of claim 17, wherein the selection of the at least one of the plurality of sensors for remote storage of its corresponding real-time data by the server computer is based on a sensor's data value being above a predetermined threshold.

20. The system of claim 17, wherein communicating current real-time data from the collection computer to the server computer further comprises:
enabling the user to select a separate sampling rate of the current real-time data for at least a portion of the plurality of sensors; and
enabling the user to select a separate period of time for communicating current real-time data for at least a portion of the plurality of sensors to the server computer.

21. The system of claim 17, wherein the collection computer performs further actions, comprising monitoring at least one of a Controller Area Network, Aircraft Data Network, or a National Marine Equipment 2000 network for message identifiers that correspond to each sensor currently providing real-time data to the collection computer.

22. The system of claim 17, wherein the server computer performs further actions comprising:
providing a separate database for each collection computer; and
providing a separate column in a table for current real-time data for each of the plurality of sensors detected by the collection computer.

23. The system of claim 17, wherein selecting the at least one of the plurality of sensors for local storage of its corresponding real-time data at the collection computer is based on a network connection between the collection computer and the server computer.

24. The system of claim 17, wherein employing the template to automatically remotely display at least one characteristic of the machine includes at least one user modifiable visualization that represents at least one sensor's current real-time data.

25. A network computer for managing sensor data for a machine, comprising:
a memory for storing at least instructions; and
a processor that executes the instructions to enable actions, including
enabling a collection computer to automatically detect each of a plurality of sensors that is currently providing real-time data regarding at least one characteristic of the machine, wherein the collection computer is coupled to the machine and in communication with a remotely located server computer, and wherein each sensor has one or more type;
enabling selection of at least one of the plurality of sensors for local storage of its corresponding real-time data at the collection computer;
enabling selection of at least one of the plurality of sensors for remote storage of its corresponding real-time data by the server computer;
determining a type of the machine based on the one or more types of the plurality of sensors;
automatically generating a template for the type of the machine based on a comparison of the plurality of sensors detected by the collection computer to other sensors that were most often previously monitored by a plurality of users viewing sensor data for this type of machine, wherein the template includes a plurality of predetermined visualizations for one or more of the detected sensors based on a result of the comparison and the machine's type;
employing the template to automatically remotely display at least one characteristic of the machine based on current real-time data provided by at least one of the plurality of sensors identified by the template; and
in response to the user selecting at least one of the plurality of sensors for remote display, modifying the template to include the remote display of its corresponding current real-time data.

26. The network computer of claim 25, wherein the processor that executes the instructions enables further actions, comprising dynamically updating the plurality of sensors that are currently providing real-time data based on each new sensor currently providing real-time data and each existing sensor currently disabled from providing real-time data, wherein the user is notified of each new sensor currently providing real-time data and each currently disabled sensor.

27. The network computer of claim 25, wherein the selection of the at least one of the plurality of sensors for remote storage of its corresponding real-time data by the server computer is based on a sensor's data value being above a predetermined threshold.

28. The network computer of claim 25, wherein communicating current real-time data from the collection computer to the server computer further comprises:
enabling the user to select a separate sampling rate of the current real-time data for at least a portion of the plurality of sensors; and
enabling the user to select a separate period of time for communicating current real-time data for at least a portion of the plurality of sensors to the server computer.

29. The network computer of claim 25, wherein the processor that executes the instructions enables further actions, comprising:
providing a separate database for each collection computer; and
providing a separate column in a table for current real-time data for each of the plurality of sensors detected by the collection computer.

30. The network computer of claim 25, wherein employing the template to automatically remotely display at least one characteristic of the machine includes at least one user modifiable visualization that represents at least one sensor's current real-time data.

* * * * *